United States Patent
Okamura et al.

(10) Patent No.: US 12,362,800 B2
(45) Date of Patent: Jul. 15, 2025

(54) USER TERMINAL AND RADIO COMMUNICATION METHOD

(71) Applicant: NTT DOCOMO, INC., Tokyo (JP)

(72) Inventors: Masaya Okamura, Tokyo (JP); Yuki Matsumura, Tokyo (JP); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 926 days.

(21) Appl. No.: 17/608,104

(22) PCT Filed: May 2, 2019

(86) PCT No.: PCT/JP2019/018185
§ 371 (c)(1),
(2) Date: Nov. 1, 2021

(87) PCT Pub. No.: WO2020/222274
PCT Pub. Date: Nov. 5, 2020

(65) Prior Publication Data
US 2022/0286174 A1 Sep. 8, 2022

(51) Int. Cl.
*H04B 7/06* (2006.01)
*H04B 7/0456* (2017.01)
*H04W 52/36* (2009.01)

(52) U.S. Cl.
CPC ......... *H04B 7/0623* (2013.01); *H04B 7/0456* (2013.01); *H04B 7/0639* (2013.01); *H04W 52/367* (2013.01)

(58) Field of Classification Search
None
See application file for complete search history.

(56) References Cited

U.S. PATENT DOCUMENTS

| | | | | |
|---|---|---|---|---|
| 2018/0183503 | A1* | 6/2018 | Rahman | H04B 7/0486 |
| 2019/0081667 | A1* | 3/2019 | Yang | H04B 7/0456 |
| 2019/0181939 | A1* | 6/2019 | Liu | H04B 7/0486 |
| 2019/0182001 | A1* | 6/2019 | Lee | H04W 72/21 |
| 2019/0312617 | A1* | 10/2019 | Wernersson | H04B 7/0486 |
| 2019/0327693 | A1* | 10/2019 | Rahman | H04W 52/42 |

(Continued)

OTHER PUBLICATIONS

Office Action issued in Japanese Application No. 2021-517142; Dated Sep. 27, 2022 (6 pages).

(Continued)

*Primary Examiner* — Ayman A Abaza
*Assistant Examiner* — Camquyen Thai
(74) *Attorney, Agent, or Firm* — Osha Bergman Watanabe & Burton LLP

(57) ABSTRACT

A user terminal according to one aspect of the present disclosure includes: a control section that, when capability information that indicates that full power transmission is supported is transmitted, and when a non coherent or partial and non coherent codebook subsets are configured, assumes that downlink control information can indicate a fully coherent codebook subset; and a transmitting section that performs the full power transmission by applying the fully coherent codebook subset to uplink transmission based on the downlink control information. According to one aspect of the present disclosure, it is possible to appropriately control full power transmission.

5 Claims, 24 Drawing Sheets

| Bit field mapped to index | codebookSubset= partialAndNonCoherent |
|---|---|
| 0 | 1 layer: TPMI=0 |
| 1 | 1 layer: TPMI=1 |
| 2 | 1 layer: TPMI=2 |
| 3 | 1 layer: TPMI=3 |
| ... | ... |
| 11 | 1 layer: TPMI=11 |
| 12 | 1 layer: TPMI=12 |
| 13 | 1 layer: TPMI=13 |
| 14 | 1 layer: TPMI=14 |
| 15 | 1 layer: TPMI=15 |

(56) References Cited

U.S. PATENT DOCUMENTS

2022/0109474 A1* 4/2022 Haghighat ............ H04B 7/0626
2022/0279492 A1* 9/2022 Park ..................... H04B 7/0628

OTHER PUBLICATIONS

Office Action issued in Chinese Application No. 201980098041.X; Dated Jul. 6, 2023 (12 pages).
International Search Report issued in PCT/JP2019/018185 on Nov. 26, 2019 (1 page).
Written Opinion of the International Searching Authority issued in PCT/JP2019/018185 on Nov. 26, 2019 (4 pages).
Nokia, Nokia Shanghai Bell; "On the full Tx power UL transmission"; 3GPP TSG-RAN WG1 Meeting #96bis, R1-1905066; Xi'an, China; Apr. 8-12, 2019 (6 pages).
LG Electronics; "Text proposals on UL PT-RS power boosting"; 3GPP TSG RAN WG1 Meeting #92, R1-1802201; Athens, Greece; Feb. 26-Mar. 2, 2018 (7 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

\* cited by examiner

FIG. 3B

| Bit field mapped to index | codebookSubset= nonCoherent |
|---|---|
| 0 | 1 layer: TPMI=0 |
| 1 | 1 layer: TPMI=1 |
| 2 | 1 layer: TPMI=2 |
| 3 | Reserved |

FIG. 3A

| TPMI INDEX | PRECODING MATRIX W (ORDERED IN ASCENDING ORDER OF TPMI INDICES FROM LEFT TO RIGHT) |
|---|---|
| 0 – 5 | $\frac{1}{\sqrt{2}}\begin{bmatrix}1\\0\end{bmatrix}$, $\frac{1}{\sqrt{2}}\begin{bmatrix}0\\1\end{bmatrix}$, $\frac{1}{\sqrt{2}}\begin{bmatrix}1\\1\end{bmatrix}$, $\frac{1}{\sqrt{2}}\begin{bmatrix}1\\-1\end{bmatrix}$, $\frac{1}{\sqrt{2}}\begin{bmatrix}1\\j\end{bmatrix}$, $\frac{1}{\sqrt{2}}\begin{bmatrix}1\\-j\end{bmatrix}$ |

╶ ╴ NON COHERENT CODEBOOK

⋯ FULLY COHERENT CODEBOOK

FIG. 4B

| Bit field mapped to index | codebookSubset= nonCoherent |
|---|---|
| 0 | 1 layer: TPMI=0 |
| 1 | 1 layer: TPMI=2 |

FIG. 4A

| TPMI INDEX | PRECODING MATRIX W (ORDERED IN ASCENDING ORDER OF TPMI INDICES FROM LEFT TO RIGHT) |
|---|---|
| 0 – 5 | $\frac{1}{\sqrt{2}}\begin{bmatrix}1\\0\end{bmatrix}$ $\frac{1}{\sqrt{2}}\begin{bmatrix}0\\1\end{bmatrix}$ $\frac{1}{\sqrt{2}}\begin{bmatrix}1\\1\end{bmatrix}$ $\frac{1}{\sqrt{2}}\begin{bmatrix}1\\-1\end{bmatrix}$ $\frac{1}{\sqrt{2}}\begin{bmatrix}1\\j\end{bmatrix}$ $\frac{1}{\sqrt{2}}\begin{bmatrix}1\\-j\end{bmatrix}$ . . |

⌐ ┐ NON COHERENT CODEBOOK
└ ┘

⌐ ┐ FULLY COHERENT CODEBOOK
└ ┘

FIG. 5B

| Bit field mapped to index | codebookSubset= nonCoherent |
|---|---|
| 0 | 1 layer: TPMI=0 |
| 1 | 1 layer: TPMI=1 |
| 2 | 1 layer: TPMI=2 |
| 3 | 1 layer: TPMI=3 |
| 4 | 1 layer: TPMI=4 |
| 5 | 1 layer: TPMI=5 |
| 6-7 | Reserved |

FIG. 5A

| TPMI INDEX | PRECODING MATRIX W (ORDERED IN ASCENDING ORDER OF TPMI INDICES FROM LEFT TO RIGHT) |
|---|---|
| 0 – 5 | $\frac{1}{\sqrt{2}}\begin{bmatrix}1\\0\end{bmatrix}$ $\frac{1}{\sqrt{2}}\begin{bmatrix}0\\1\end{bmatrix}$ $\frac{1}{\sqrt{2}}\begin{bmatrix}1\\1\end{bmatrix}$ $\frac{1}{\sqrt{2}}\begin{bmatrix}1\\-1\end{bmatrix}$ $\frac{1}{\sqrt{2}}\begin{bmatrix}1\\j\end{bmatrix}$ $\frac{1}{\sqrt{2}}\begin{bmatrix}1\\-j\end{bmatrix}$ |

⌐ ¬ NON COHERENT CODEBOOK
└ ┘

⌐ ¬ FULLY COHERENT CODEBOOK
└ ┘

| Bit field mapped to index | codebookSubset= partialAndNonCoherent |
|---|---|
| 0 | 1 layer: TPMI=0 |
| 1 | 1 layer: TPMI=1 |
| 2 | 1 layer: TPMI=2 |
| 3 | 1 layer: TPMI=3 |
| ... | ... |
| 11 | 1 layer: TPMI=11 |
| 12 | 1 layer: TPMI=12 |
| 13 | 1 layer: TPMI=13 |
| 14 | 1 layer: TPMI=14 |
| 15 | 1 layer: TPMI=15 |

FIG. 11A

NON COHERENT CODEBOOK
PARTIAL COHERENT CODEBOOK
FULLY COHERENT CODEBOOK

FIG. 12A

| TPMI INDEX | PRECODING MATRIX W (ORDERED IN ASCENDING ORDER OF TPMI INDICES FROM LEFT TO RIGHT) | | | | | | | |
|---|---|---|---|---|---|---|---|---|
| 0 – 7 | $\frac{1}{2}\begin{bmatrix}1&0\\0&0\end{bmatrix}$ | $\frac{1}{2}\begin{bmatrix}0&1\\0&0\end{bmatrix}$ | $\frac{1}{2}\begin{bmatrix}1&0\\0&1\end{bmatrix}$ | $\frac{1}{2}\begin{bmatrix}0&0\\1&0\end{bmatrix}$ | $\frac{1}{2}\begin{bmatrix}1&0\\0&-1\end{bmatrix}$ | $\frac{1}{2}\begin{bmatrix}1&0\\0&j\end{bmatrix}$ | $\frac{1}{2}\begin{bmatrix}1&0\\0&-j\end{bmatrix}$ | $\frac{1}{2}\begin{bmatrix}0&0\\0&1\end{bmatrix}$ |
| 8 – 15 | $\frac{1}{2}\begin{bmatrix}1&1\\0&0\end{bmatrix}$ | $\frac{1}{2}\begin{bmatrix}0&0\\1&1\end{bmatrix}$ | $\frac{1}{2}\begin{bmatrix}0&1\\1&0\end{bmatrix}$ | $\frac{1}{2}\begin{bmatrix}0&1\\-1&0\end{bmatrix}$ | $\frac{1}{2}\begin{bmatrix}1&j\\0&0\end{bmatrix}$ | $\frac{1}{2}\begin{bmatrix}0&0\\1&j\end{bmatrix}$ | $\frac{1}{2}\begin{bmatrix}1&-1\\0&0\end{bmatrix}$ | $\frac{1}{2}\begin{bmatrix}0&0\\1&-1\end{bmatrix}$ |
| 16 – 23 | $\frac{1}{2}\begin{bmatrix}1&1\\1&1\end{bmatrix}$ | $\frac{1}{2}\begin{bmatrix}1&j\\j&-1\end{bmatrix}$ | $\frac{1}{2}\begin{bmatrix}1&j\\1&j\end{bmatrix}$ | $\frac{1}{2}\begin{bmatrix}1&j\\-j&-1\end{bmatrix}$ | $\frac{1}{2}\begin{bmatrix}1&-1\\1&-1\end{bmatrix}$ | $\frac{1}{2}\begin{bmatrix}1&-1\\-j&j\end{bmatrix}$ | $\frac{1}{2}\begin{bmatrix}1&-1\\-1&1\end{bmatrix}$ | $\frac{1}{2}\begin{bmatrix}1&-1\\j&-j\end{bmatrix}$ |
| 24 – 27 | $\frac{1}{2}\begin{bmatrix}1&-j\\1&-j\end{bmatrix}$ | $\frac{1}{2}\begin{bmatrix}1&-j\\j&1\end{bmatrix}$ | $\frac{1}{2}\begin{bmatrix}1&-j\\-1&j\end{bmatrix}$ | $\frac{1}{2}\begin{bmatrix}1&-j\\-j&-1\end{bmatrix}$ | - | - | - | - |

NON COHERENT CODEBOOK
PARTIAL COHERENT CODEBOOK
FULLY COHERENT CODEBOOK

FIG. 12B

| Bit field mapped to index | codebookSubset= partialAndNonCoherent |
|---|---|
| 0 | 1 layer: TPMI=0 |
| 1 | 1 layer: TPMI=1 |
| 2 | 1 layer: TPMI=2 |
| 3 | 1 layer: TPMI=3 |
| ... | ... |
| 11 | 1 layer: TPMI=11 |
| 12 | 1 layer: TPMI=12 |
| ... | ... |
| 27 | 1 layer: TPMI=27 |
| 28-31 | Reserved |

FIG. 13

| TPMI INDEX | PRECODING MATRIX W (ORDERED IN ASCENDING ORDER OF TPMI INDICES FROM LEFT TO RIGHT) | | | | | |
|---|---|---|---|---|---|---|
| 0-5 | $\frac{1}{\sqrt{2}}\begin{bmatrix}1\\0\end{bmatrix}$ | $\frac{1}{\sqrt{2}}\begin{bmatrix}0\\1\end{bmatrix}$ | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ |

◯ FULLY COHERENT CODEBOOK

FIG. 16A

| TPMI INDEX | PRECODING MATRIX W (ORDERED IN ASCENDING ORDER OF TPMI INDICES FROM LEFT TO RIGHT) | | | | | |
|---|---|---|---|---|---|---|
| 0-5 | $\frac{1}{\sqrt{2}}\begin{bmatrix}1\\0\end{bmatrix}$ | $\frac{1}{\sqrt{2}}\begin{bmatrix}0\\1\end{bmatrix}$ | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ |

⌐ ¬
⌊_ _⌋ FULLY COHERENT CODEBOOK

FIG. 16B

| Bit field mapped to index | codebookSubset= nonCoherent |
|---|---|
| 0 | 1 layer: TPMI=2 |
| 1 | 1 layer: TPMI=3 |

FIG. 17B

| Bit field mapped to index | codebookSubset= nonCoherent |
|---|---|
| 0 | 1 layer: TPMI=2 |
| 1 | 1 layer: TPMI=3 |
| 2 | 1 layer: TPMI=4 |
| 3 | 1 layer: TPMI=5 |

FIG. 17A

| TPMI INDEX | PRECODING MATRIX W (ORDERED IN ASCENDING ORDER OF TPMI INDICES FROM LEFT TO RIGHT) | | | | | |
|---|---|---|---|---|---|---|
| 0–5 | $\frac{1}{\sqrt{2}}\begin{bmatrix}1\\0\end{bmatrix}$ | $\frac{1}{\sqrt{2}}\begin{bmatrix}0\\1\end{bmatrix}$ | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ |

☐ FULLY COHERENT CODEBOOK

FIG. 18B

| Bit field mapped to index | codebookSubset= nonCoherent |
|---|---|
| 0 | 1 layer: TPMI=12 |
| 1 | Reserved |

FIG. 18A

| TPMI INDEX | PRECODING MATRIX W (ORDERED IN ASCENDING ORDER OF TPMI INDICES FROM LEFT TO RIGHT) | | | | | | | |
|---|---|---|---|---|---|---|---|---|
| 0 – 7 | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ |
| 8 – 15 | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ | $\frac{1}{2}\begin{bmatrix}1\\1\\1\\-1\end{bmatrix}$ | $\frac{1}{2}\begin{bmatrix}1\\1\\j\\j\end{bmatrix}$ | $\frac{1}{2}\begin{bmatrix}1\\1\\-1\\1\end{bmatrix}$ | $\frac{1}{2}\begin{bmatrix}1\\1\\-j\\-j\end{bmatrix}$ |
| 16 – 23 | $\frac{1}{2}\begin{bmatrix}1\\j\\1\\j\end{bmatrix}$ | $\frac{1}{2}\begin{bmatrix}1\\j\\j\\1\end{bmatrix}$ | $\frac{1}{2}\begin{bmatrix}1\\j\\-1\\-j\end{bmatrix}$ | $\frac{1}{2}\begin{bmatrix}1\\j\\-j\\-1\end{bmatrix}$ | $\frac{1}{2}\begin{bmatrix}1\\-1\\1\\1\end{bmatrix}$ | $\frac{1}{2}\begin{bmatrix}1\\-1\\j\\-j\end{bmatrix}$ | $\frac{1}{2}\begin{bmatrix}1\\-1\\-1\\1\end{bmatrix}$ | $\frac{1}{2}\begin{bmatrix}1\\-1\\-j\\j\end{bmatrix}$ |
| 24 – 27 | $\frac{1}{2}\begin{bmatrix}1\\-j\\1\\-j\end{bmatrix}$ | $\frac{1}{2}\begin{bmatrix}1\\-j\\j\\-1\end{bmatrix}$ | $\frac{1}{2}\begin{bmatrix}1\\-j\\-1\\j\end{bmatrix}$ | $\frac{1}{2}\begin{bmatrix}1\\-j\\-j\\1\end{bmatrix}$ | – | – | – | – |

▢ FULLY COHERENT CODEBOOK

| Bit field mapped to index | codebookSubset= nonCoherent |
|---|---|
| 0 | 1 layer: TPMI=12 |
| 1 | 1 layer: TPMI=13 |
| 2 | 1 layer: TPMI=14 |
| 3 | 1 layer: TPMI=15 |

FULLY COHERENT CODEBOOK

FIG. 20B

| Bit field mapped to index | codebookSubset= nonCoherent |
|---|---|
| 0 | 1 layer: TPMI=12 |
| 1 | 1 layer: TPMI=13 |
| ...... | ...... |
| 15 | 1 layer: TPMI=27 |

FIG. 20A

| TPMI INDEX | PRECODING MATRIX W (ORDERED IN ASCENDING ORDER OF TPMI INDICES FROM LEFT TO RIGHT) | | | | | | | |
|---|---|---|---|---|---|---|---|---|
| 0–7 | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ |
| 8–15 | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ | $\frac{1}{2}\begin{bmatrix}1\\1\\1\\-1\end{bmatrix}$ | $\frac{1}{2}\begin{bmatrix}1\\1\\1\\-1\end{bmatrix}$ | $\frac{1}{2}\begin{bmatrix}1\\1\\-1\\1\end{bmatrix}$ | $\frac{1}{2}\begin{bmatrix}1\\1\\-1\\-1\end{bmatrix}$ |
| 16–23 | $\frac{1}{2}\begin{bmatrix}1\\j\\1\\j\end{bmatrix}$ | $\frac{1}{2}\begin{bmatrix}1\\j\\j\\-1\end{bmatrix}$ | $\frac{1}{2}\begin{bmatrix}1\\j\\-1\\-j\end{bmatrix}$ | $\frac{1}{2}\begin{bmatrix}1\\j\\-j\\1\end{bmatrix}$ | $\frac{1}{2}\begin{bmatrix}1\\-1\\1\\-1\end{bmatrix}$ | $\frac{1}{2}\begin{bmatrix}1\\-1\\j\\-j\end{bmatrix}$ | $\frac{1}{2}\begin{bmatrix}1\\-1\\-1\\1\end{bmatrix}$ | $\frac{1}{2}\begin{bmatrix}1\\-1\\-j\\j\end{bmatrix}$ |
| 24–27 | $\frac{1}{2}\begin{bmatrix}1\\-j\\1\\-j\end{bmatrix}$ | $\frac{1}{2}\begin{bmatrix}1\\-j\\j\\1\end{bmatrix}$ | $\frac{1}{2}\begin{bmatrix}1\\-j\\-1\\j\end{bmatrix}$ | $\frac{1}{2}\begin{bmatrix}1\\-j\\-j\\-1\end{bmatrix}$ | | | | |

☐ FULLY COHERENT CODEBOOK

USER TERMINAL AND RADIO COMMUNICATION METHOD

TECHNICAL FIELD

The present disclosure relates to a user terminal and a radio communication method of a next-generation mobile communication system.

BACKGROUND ART

In Universal Mobile Telecommunications System (UMTS) networks, for the purpose of higher data rates and lower latency, Long Term Evolution (LTE) has been specified (Non-Patent Literature 1). Furthermore, for the purpose of a larger capacity and higher sophistication than those of LTE (Third Generation Partnership Project (3GPP) Releases (Rel.) 8 and 9), LTE-Advanced (3GPP Rel. 10 to 14) has been specified.

LTE successor systems (also referred to as, for example, the 5th generation mobile communication system (5G), 5G+ (plus), New Radio (NR) or 3GPP Rel. 15 or subsequent releases) are also studied.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

It is studied for a future radio communication system (e.g., NR) to support codebook-based transmission that uses a precoding matrix.

However, according to previous specifications according to Rel-15 NR, when a UE performs codebook-based transmission by using a plurality of ports, if the UE uses part of codebooks, there is a case where transmission power becomes low (full power transmission cannot be performed) compared to a single port. When, for example, a Power Amplifier (PA) connected with part of antenna ports is not a PA (full rated PA) that can output maximum rated power, there is a risk that it is not possible to perform full power transmission. When it is not possible to perform full power transmission, there is a risk that a coverage decreases, and an increase of a communication throughput is suppressed.

It is therefore one of objects of the present disclosure to provide a user terminal and a radio communication method that can appropriately control full power transmission.

Solution to Problem

A user terminal according to one aspect of the present disclosure includes: a control section that, when capability information that indicates that full power transmission is supported is transmitted, and when a non coherent or partial and non coherent codebook subsets are configured, assumes that downlink control information can indicate a fully coherent codebook subset; and a transmitting section that performs the full power transmission by applying the fully coherent codebook subset to uplink transmission based on the downlink control information.

Advantageous Effects of Invention

According to one aspect of the present disclosure, it is possible to appropriately control full power transmission.

BRIEF DESCRIPTION OF DRAWINGS

FIGS. 3A and 3B are diagrams illustrating a first example of notification of a TPMI to a non coherent UE that performs single layer transmission by using 2 antenna ports according to a first embodiment.

FIGS. 4A and 4B are diagrams illustrating a second example of notification of a TPMI to the non coherent UE that performs single layer transmission by using the 2 antenna ports according to the first embodiment.

FIGS. 5A and 5B are diagrams illustrating a third example of notification of a TPMI to the non coherent UE that performs single layer transmission by using the 2 antenna ports according to the first embodiment.

FIGS. 8A and 8B are diagrams illustrating a third example of notification of a TPMI to the non coherent UE that performs single layer transmission by using the 4 antenna ports according to the first embodiment.

FIGS. 9A and 9B are diagrams illustrating a fourth example of notification of a TPMI to the non coherent UE that performs single layer transmission by using the 4 antenna ports according to the first embodiment.

FIGS. 11A and 11B are diagrams illustrating a second example of notification of a TPMI to the partial non coherent UE that performs single layer transmission by using the 4 antenna ports according to the first embodiment.

FIGS. 12A and 12B are diagrams illustrating a third example of notification of a TPMI to the partial non coherent UE that performs single layer transmission by using the 4 antenna ports according to the first embodiment.

FIG. 13 is a diagram illustrating a first example of notification of a TPMI to a non coherent UE that performs 2-layer transmission by using 4 antenna ports according to the first embodiment.

FIGS. 15A and 15B are diagrams illustrating a first example of notification of a TPMI to a non coherent UE that performs single layer transmission by using 2 antenna ports according to a second embodiment.

FIGS. 16A and 16B are diagrams illustrating a second example of notification of a TPMI to the non coherent UE that performs single layer transmission by using the 2 antenna ports according to the second embodiment.

FIGS. 17A and 17B are diagrams illustrating a third example of notification of a TPMI to the non coherent UE that performs single layer transmission by using the 2 antenna ports according to the second embodiment.

FIGS. 18A and 18B are diagrams illustrating a first example of notification of a TPMI to a non coherent UE that performs single layer transmission by using 4 antenna ports according to the second embodiment.

FIGS. 20A and 20B are diagrams illustrating a third example of notification of a TPMI to the non coherent UE that performs single layer transmission by using the 4 antenna ports according to the second embodiment.

DESCRIPTION OF EMBODIMENTS (PUSCH Precoder)

Figure 1:
FIG. 1 is a diagram illustrating one example of an association between a precoder type and a TPMI index.

It is studied for NR that a UE supports at least one of Codebook (CB)-based transmission and Non-Codebook (NCB)-based transmission.

For example, it is studied to decide a precoder (precoding matrix) for at least one of CB-based and NCB-based uplink shared channel (Physical Uplink Shared Channel (PUSCH)) transmission by using at least a Sounding Reference Signal (SRS) Resource Index (SRS Resource Index (SRI)).

In a case of CB-based transmission, the UE may determine a precoder for PUSCH transmission based on, for example, an SRI, a Transmitted Rank Indicator (TRI) and a Transmitted Precoding Matrix Indicator (TPMI). In a case of NCB-based transmission, the UE may determine a precoder for PUSCH transmission based on an SRI.

For example, the SRI, the TRI and the TPMI may be notified to the UE by using Downlink Control Information (DCI). The SRI may be indicated by an SRS Resource Indicator field (SRI field) of the DCI, or may be indicated by a parameter "srs-ResourceIndicator" included in an RRC information element "ConfiguredGrantConfig" of a configured grant PUSCH. The TRI and the TPMI may be indicated by a precoding information and number of layers field of the DCI.

The UE may report UE capability information related to a precoder type, and a base station may configure the precoder type that is based on the UE capability information to the UE by a higher layer signaling. The UE capability information may be information (that may be expressed as an RRC parameter "pusch-TransCoherence") of the precoder type that the UE uses for PUSCH transmission.

In the present disclosure, a higher layer signaling may be one or a combination of, for example, a Radio Resource Control (RRC) signaling, a Medium Access Control (MAC) signaling and broadcast information.

The MAC signaling may use, for example, an MAC Control Element (MAC CE) or an MAC Protocol Data Unit (PDU). The broadcast information may be, for example, a Master Information Block (MIB) and a System Information Block (SIB).

The UE may determine a precoder used for PUSCH transmission based on information (that may be expressed as an RRC parameter "codebookSubset") of a precoder type included in PUSCH configuration information (a "PUSCH-Config" information element of an RRC signaling) notified by a higher layer signaling. A subset of a PMI indicated by a TPMI may be configured to the UE by codebookSubset.

In this regard, the precoder type may be indicated by one or a combination of at least two of fully coherent (full coherent or coherent), partial coherent and non coherent (that may be expressed as parameters such as fully and partial and non coherent (fullyAndPartialAndNonCoherent) and partial and non coherent (partialAndNonCoherent)).

Fully coherent may mean that synchronization between all antenna ports used for transmission is established (which may be expressed as that phases can be matched or that precoders to be applied are the same). Partial coherent may mean that synchronization is established between part of ports of antenna ports used for transmission, yet synchronization cannot be established between the part of ports and other ports. Non coherent may mean that synchronization between each antenna port used for transmission cannot be established.

In addition, it may be assumed that the UE that supports a precoder type of fully coherent supports precoder types of partial coherent and non coherent. It may be assumed that the UE that supports the precoder type of partial coherent supports the precoder type of non coherent.

The precoder type may be read as, for example, coherency, PUSCH transmission coherence, a coherent type, a coherence type, a codebook type, a codebook subset and a codebook subset type.

The UE may determine from a plurality of precoders (that may be referred to as, for example, precoding matrices or codebooks) for CB-based transmission a precoding matrix associated with a TPMI index that can be obtained from DCI for scheduling UL transmission.

FIG. 1 is a diagram illustrating one example of an association between a precoder type and a TPMI index. FIG. 1 corresponds to a table of a precoding matrix W for single layer transmission that uses 4 antenna ports according to Discrete Fourier Transform spread OFDM (DFT-s-OFDM where transform precoding is enabled).

In a case where a precoder type (codebookSubset) is fully and partial and non coherent (fullyAndPartialAndNonCoherent) in FIG. 1, the UE is notified of a TPMI that is one of 0 to 27 for single layer transmission. Furthermore, in a case where a precoder type is partial and non coherent (partialAndNonCoherent), a TPMI that is one of 0 to 11 is configured to the UE for single layer transmission. In a case where a precoder type is non coherent (nonCoherent), a TPMI that is one of 0 to 3 is configured to the UE for single layer transmission.

FIG. 1 illustrates a table that is specified in current Rel-15 NR. According to this table, when transmission power of fully coherent corresponding to indices 12 to 27 is $1(=(½)^2*4)$ transmission power of partial coherent corresponding to indices 4 to 11 is ½(=(½)2*2), and transmission power of non coherent corresponding to indices 0 to 3 is ¼(=(½)2*1).

That is, according to a specification of current Rel-15 NR, when the UE performs codebook-based transmission by using a plurality of ports, if the UE uses part of codebooks, there is a case where transmission power becomes low compared to a single port (full power transmission cannot be performed).

In addition, as illustrated in FIG. 1, a precoding matrix whose only one component of each column is not 0 may be referred to as a non coherent codebook. A precoding matrix whose only given number (not all) of components of each column are not 0 may be referred to as a partial coherent codebook. A precoding matrix whose all components of each column are not 0 may be referred to as a fully coherent codebook.

In addition, according to the present disclosure, the partial coherent codebook may correspond to codebooks (i.e., codebooks of TPMIs=4 to 11 in a case of single layer transmission of 4 antenna ports) except codebooks associated with TPMIs indicated to the UE to which a non coherent codebook subset (e.g., RRC parameter "codebookSubset"="nonCoherent") has been configured among codebooks (precoding matrices) associated with TPMIs indicated by DCI for codebook-based transmission to the UE to which a partial coherent codebook subset (e.g., RRC parameter "codebookSubset"="partialAndNonCoherent") has been configured.

In addition, according to the present disclosure, the fully coherent codebook may correspond to codebooks (i.e., codebooks of TPMIs=12 to 27 in a case of single layer transmission of 4 antenna ports) except codebooks associated with TPMIs indicated to the UE to which a partial coherent codebook subset (e.g., RRC parameter "codebookSubset"="partialAndNonCoherent") has been configured among codebooks (precoding matrices) associated with TPMIs indicated by DCI for codebook-based transmission to the UE to which a fully coherent codebook subset (e.g., RRC parameter "codebookSubset"="fullyAndPartialAndNonCoherent") has been configured.

(UE Capability of Full Power Transmission)

Even when a codebook is used, it is preferable to appropriately perform full power UL transmission. Hence, according to NR, UE capability related to codebook-based full power UL transmission that uses a plurality of Power Amplifiers (PAs)) has been studied. An argument on NR made so far proposes following UE capabilities 1 to 3:

UE capability 1: Each transmission chain (Tx chain) supports (includes) a PA (full rated PA) that can output maximum rated power, UE capability 2: No transmission chain supports the full rated PA, and UE capability 3: A subset (part) of a transmission chain supports the full rated PA.

In addition, the UE that has at least one of the UE capabilities 1 to 3 may mean that the UE supports full power of UL transmission. The UE may report capability information that indicates that the UE supports UL full power transmission capability in addition to the UE capabilities 1 to 3 to a network (e.g., base station).

The UE capabilities 1/2/3 may be each read as, for example, the UE capability 1/2/3 related to full power transmission, full power transmission type 1/2/3 and power allocation type 1/2/3. In this regard, the type may be read as, for example, a mode or capability. Furthermore, 1/2/3 may be read as a set of arbitrary numbers or characters such as A/B/C.

Figure 2:
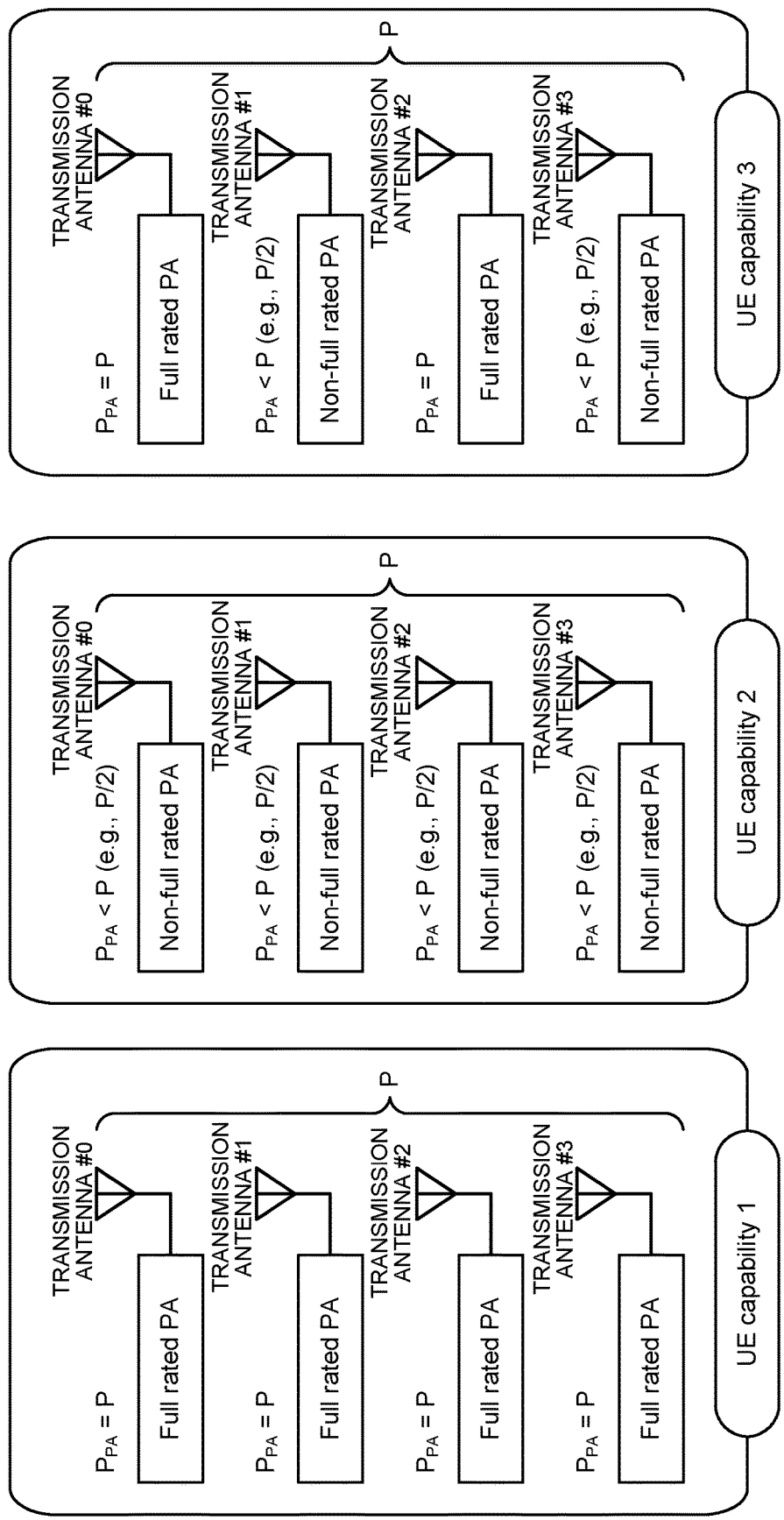
FIG. 2 is a diagram illustrating one example of a UE configuration assumed by UE capabilities 1 to 3 related to full power transmission.

FIG. 2 is a diagram illustrating one example of a UE configuration assumed by the UE capabilities 1 to 3 related to full power transmission. FIG. 2 schematically illustrates only PAs and transmission antenna ports (that may be read as transmission antennas) as a UE configuration. In addition, FIG. 2 illustrates an example where the numbers of the PAs and the transmission antenna ports are each 4. However, the numbers of the PAs and the transmission antenna ports are not limited to this.

In addition, P represents UE maximum output power [dBm], and $P_{PA}$ represents PA maximum output power [dBm]. In addition, P may be, for example, 23 dBm in a case of the UE of power class 3, and 26 dBm in a case of the UE of power class 2. The present disclosure assumes $P_{PA} \leq P$. However, embodiments of the present disclosure may be applied to a case of $P_{PA} > P$.

Although implementation of a configuration of the UE capability 1 is assumed to be costly, the configuration of the UE capability 1 enables full power transmission by using one or more arbitrary antenna ports. A configuration of the UE capability 2 includes only non-full rated PAs, and is expected to be able to be implemented at low cost. However, the configuration of the UE capability 2 does not enable full power transmission by using only one antenna port, and therefore is demanded to control, for example, a phase and an amplitude of a signal to be input to each PA.

The configuration of the UE capability 3 is a middle of the configuration of the UE capability 1 and the configuration of the UE capability 2. The configuration of the UE capability 3 includes antenna ports (transmission antennas #0 and #2 in this example) that can perform full power transmission, and antenna ports (antennas #1 and #3 in this example) that cannot perform full power transmission in a mixed manner.

In addition, indices and the number of antenna ports of the UE capability 3 that can perform full power transmission are not limited to these. Furthermore, this example assumes $P_{PA}=P/2$ of the non-full rated PA. However, the value of $P_{PA}$ is not limited to this.

By the way, it is studied to configure a plurality of SRS resources respectively associated with different numbers of SRS ports to enable the UE to perform full power transmission using the UE capability 2. By this means, it is expected to associate a different SRS port with a transmission signal of each antenna, and realize full power transmission by applying Cyclic Delay Diversity (CDD).

However, as described with reference to FIG. 1, one antenna port can only be indicated to, for example, a non coherent UE by using a TPMI=0 to 3. When, for example, ½[1 0 0 0]$^T$ (T represents a transpose. The same applies likewise below) is indicated by a TPMI as a codebook (precoding matrix), the UE transmits a PUSCH by using one antenna port.

Hence, in a case where the UE conforming to legacy Rel-15 NR does not have fully coherent capability and includes the configuration of the UE capability 2, the UE cannot perform full power transmission to which CDD is applied. When full power transmission cannot be performed, there is a risk that a coverage decreases, and an increase of a communication throughput is suppressed.

Hence, the inventors of the present disclosure have conceived a control method for appropriately performing full power transmission. According to one aspect of the present disclosure, it is possible to perform UL Multi Input Multi Output (MIMO) transmission at full power, and maintain a cell coverage similar to that of a single antenna. Furthermore, according to UL MIMO, it is possible to obtain a spatial diversity gain and expect an increase of a throughput. Furthermore, even the UE that does not include full rated PAs can appropriately perform full power transmission.

The embodiments according to the present disclosure will be described in detail with reference to the drawings. A radio communication method according to each embodiment may be each applied alone or may be applied in combination.

In addition, an "antenna" and an "antenna port" in the following embodiments may be interchangeably read.

Furthermore, according to the present disclosure, that the UE has UE capability X (X=1, 2 and 3) may be interchangeably read as, for example, that the UE reports the UE capability X or that the UE can perform full power transmission by using a configuration of the UE capability X.

According to the present disclosure, that the UE has capability related to coherent (e.g., fully coherent, partial coherent and non coherent) may be interchangeably read as, for example, that the UE reports the capability or that the UE is configured with the coherent.

Furthermore, the non coherent UE, the partial coherent UE and the fully coherent UE may be each interchangeably read as a UE that has capability related to non coherent, a UE that has capability related to partial coherent, and a UE that has capability related to fully coherent.

Furthermore, the non coherent UE, the partial coherent UE and the fully coherent UE may each mean a UE to which "non coherent (nonCoherent)", "partial and non coherent (partialAndNonCoherent)" and "fully and partial and non coherent (fullyAndPartialAndNonCoherent)" codebook subsets are configured by a higher layer. In addition, according to the present disclosure, a codebook subset and a codebook may be interchangeably read.

Furthermore, the non coherent UE, the partial coherent UE and the fully coherent UE may each mean a UE that can perform transmission by using a non coherent codebook, a partial coherent codebook and a fully coherent codebook.

In addition, a UE in the following embodiments may be read as, for example, a non coherent UE that has the UE capability 2, and a partial coherent UE that has the UE capability 2. However, an application range of the present disclosure is not limited to this, and the radio communication method based on the following embodiments may be applied to arbitrary UEs irrespectively of the UE capabilities 1 to 3.

(Radio Communication Method)

When having reported one or both of capability information that indicates that the UE supports UL full power transmission capability and the UE capability 2 to the network, and when performing UL codebook-based transmission, the UE may perform at least one operation of a first embodiment and a second embodiment described below.

When being notified of configuration information that permits (or enables) UL full power transmission (e.g., UL full power transmission based on the UE capability 2) from the network, the UE may perform at least one operation of the first embodiment and the second embodiment described below.

In addition, the UE may be at least one of the non coherent UE and the partial coherent UE. In the following description of the present disclosure, unless specified otherwise, the "UE" may be read as "at least one of the non coherent UE and the partial coherent UE".

After the operation of the first or second embodiment, the UE may apply Cyclic Delay Diversity (CDD), and each antenna may transmit a PUSCH. "CDD" in the present disclosure may be interchangeably read as specific CDD such as Small Cyclic Delay Diversity (SCDD) and Large Cyclic Delay Diversity (LCDD), or may include meanings of these CDD. In this regard, SCDD may mean CDD that applies a smaller cyclic delay amount than that of general CDD or LCDD.

The UE may assume that each transmission chain is associated with a different antenna port (e.g., SRS port). The UE may transmit the same PUSCH by using the number of antenna ports (e.g., RRC parameter "nrofSRS-Ports") of an SRS configured by a higher layer signaling (e.g., RRC signaling).

The UE may assume that, when UL codebook-based transmission is configured (RRC parameter "txConfig"=codebook), DCI (e.g., DCI format 11) for scheduling UL transmission (e.g., PUSCH or an SRS) indicates a TPMI associated with a codebook subset that supports full power transmission. In addition, the codebook subset (or codebook) that supports full power transmission may correspond to a fully coherent codebook subset, and may be referred to as a non-antenna selection precoder.

In the first embodiment, the non coherent UE and the partial coherent UE may assume that both of a codebook subset that does not support full power and a codebook subset that supports full power can be indicated. According to the first embodiment, the UE can switch between full power and non full power according to a TPMI to be indicated.

In the second embodiment, the non coherent UE and the partial coherent UE may assume that only a codebook subset that supports full power can be indicated. According to the second embodiment, the UE can perform transmission (of a PUSCH) at full power at all times by using a plurality of antennas that have a non coherent relation.

When the UE does not report capability information that indicates that the UE supports UL full power transmission capability, to the network (or the UE does not report the UE capability 2), or is not notified of configuration information that permits (or enables) UL full power transmission from the network, and when the UE performs UL codebook-based transmission, the UE may assume that only the non coherent codebook (in a case of the non coherent UE) or only the non coherent codebook and the partial coherent codebook (in a case of partial coherent) are indicated.

In addition, the "precoding information and number of layers field" is also referred to simply as a "precoding field" for ease of description below.

First Embodiment

According to the first embodiment, a UE may decide the number of bits of a precoding field of DCI based on whether or not a transform precoder is enabled, a maximum number of ranks, a codebook subset, and UE capability (e.g., capability that indicates that UL full transmission capability is supported such as UE capability 2) related to UL full power transmission or configuration information (e.g., configuration information that enables UL full power transmission (for the UE capability 2)) related to UL full power transmission.

Furthermore, according to the first embodiment, the UE may decide a TPMI associated with a precoding field of DCI based on a table (that may be referred to as a modified table) that is, for example, enhanced, changed or modified from a table (that may be referred to as an existing table) that is referred to in a case of the same transform precoder, the same maximum number of ranks and the same codebook subset as those of legacy Rel-15 NR.

The UE may assume that the number of bits of the precoding field included in the above DCI is larger than the number of bits of a precoding field according to legacy Rel-15 NR, and at least one value of the precoding field is associated with a TPMI of a fully coherent codebook.

In addition, the number of bits of the existing precoding field may be the number of bits that is determined based on whether or not a transform precoder is enabled, the maximum number of ranks and a codebook subset.

Furthermore, the UE may assume that the number of bits of the precoding field according to legacy Rel-15 NR and the number of bits of the precoding field included in the above DCI are equal or small, and at least one value of the precoding field is associated with the TPMI of the fully coherent codebook. In this case, the UE may assume that part of TPMIs associated with a non coherent codebook or a partial coherent codebook are not indicated.

FIGS. 3A and 3B are diagrams illustrating a first example of notification of a TPMI to the non coherent UE that performs single layer transmission by using 2 antenna ports according to the first embodiment.

As illustrated in FIG. 3A, a TPMI=2 associated with part of the fully coherent codebook other than a TPMI=0 or 1 that can be indicated to the non coherent UE that performs single layer transmission by using 2 antenna ports according to legacy Rel-15 NR can be also indicated to the UE.

In addition, the maximum number of layers of UL transmission may be configured to the UE by an RRC parameter "maxRank".

FIG. 3B is a diagram illustrating one example of a relation (above-described modified table) between a precoding field of DCI (that is described as "Bit field mapped to index" in FIG. 3B. The same applies to subsequent drawings) and a TPMI associated with that in FIG. 3. In addition, "codebookSubset=nonCoherent" is described to indicate a table that the non coherent UE refers to.

Portions with hatched backgrounds in FIG. 3B indicate portions that are, for example, enhanced, changed or modified from a table that is referred to in a case of the same transform precoder, the same maximum number of ranks and the same codebook subset as those of legacy Rel-15 NR. The same applies to the subsequent drawings.

For the non coherent UE that performs single layer transmission by using 2 antenna ports according to legacy Rel-15 NR, the precoding field is 1 bit, and only 0 or 1 is indicated as a value. In FIG. 3B, the precoding field is 2 bits, and 0 to 3 can be indicated as a value. In addition, an association between the field value and the TPMI is not limited to an order illustrated in FIG. 3B (the same applies to the subsequent drawings).

A TPMI (=2) associated with the fully coherent codebook illustrated in FIG. 3A is associated with a value (=2) of an enhanced field in FIG. 3B. In addition, "Reserved" may mean that an association is scheduled to be defined in future.

FIGS. 4A and 4B are diagrams illustrating a second example of notification of a TPMI to the non coherent UE that performs single layer transmission by using 2 antenna ports according to the first embodiment.

FIG. 4A differs from the example of FIG. 3A in that the TPMI=1 is not indicated. In this regard, the TPMI that is not indicated may be an arbitrary TPMI (e.g., 0) associated with a non codebook.

FIG. 4B is a diagram illustrating one example of a modified table associated with FIG. 4A. In the modified table, a field value 1 associated with the TPMI=1 of the existing table is changed to a TPMI=2 associated with the fully coherent codebook illustrated in FIG. 3A. In a case where the modified table in FIG. 4B is used, the number of bits of a precoding field does not increase from the number of bits of the existing table.

FIGS. 5A and 5B are diagrams illustrating a third example of notification of a TPMI to the non coherent UE that performs single layer transmission by using 2 antenna ports according to the first embodiment.

FIG. 5A differs from the example of FIG. 3A in that all TPMIs (TPMIs=2 to 5) associated with the fully coherent codebook can be indicated.

FIG. 5B is a diagram illustrating one example of a modified table associated with FIG. 5A. In FIG. 5B, the precoding field is 3 bits, and 0 to 7 can be indicated as a value.

A TPMI (=2 to 5) associated with the fully coherent codebook illustrated in FIG. 5A is associated with a value (=2 to 5) of an enhanced field in FIG. 5B. In a case where a modified table that can indicate a plurality of fully coherent codebook is used as in FIG. 5B, it is possible to use the fully coherent codebooks of different phases. Consequently, by indicating to the UE a codebook that makes a channel correlation between antennas little, it is possible to expect improvement of a gain of full power transmission.

Figure 6B:
FIGS. 6A and 6B are diagrams illustrating a first example of notification of a TPMI to the non coherent UE that performs single layer transmission by using 4 antenna ports according to the first embodiment.
Figure 6A:

FIGS. 6A and 6B are diagrams illustrating a first example of notification of a TPMI to the non coherent UE that performs single layer transmission by using 4 antenna ports according to the first embodiment. A precoding matrix W in FIG. 6A corresponds to a case where transform precoding is enabled. However, the present disclosure is applicable to a case, too, where transform precoding is disabled.

As illustrated in FIG. 6A, a TPMI=12 associated with part of the fully coherent codebook other than TPMIs=0 to 3 that can be indicated to the non coherent UE that performs single layer transmission by using 4 antenna ports according to legacy Rel-15 NR can be also indicated to the UE.

FIG. 6B is a diagram illustrating one example of a modified table associated with FIG. 6A. For the non coherent UE that performs single layer transmission by using 4 antenna ports according to legacy Rel-15 NR, the precoding field is 2 bits, and only 0 to 3 is indicated as a value. In FIG. 6B, the precoding field is 3 bits, and 0 to 7 can be indicated as a value.

A TPMI (=12) associated with the fully coherent codebook illustrated in FIG. 6A is associated with a value (=4) of an enhanced field in FIG. 6B.

Figure 7B:
FIGS. 7A and 7B are diagrams illustrating a second example of notification of a TPMI to the non coherent UE that performs single layer transmission by using the 4 antenna ports according to the first embodiment.
Figure 7A:

FIGS. 7A and 7B are diagrams illustrating a second example of notification of a TPMI to the non coherent UE that performs single layer transmission by using 4 antenna ports according to the first embodiment.

FIG. 7A differs from the example of FIG. 6A in that the TPMI=3 is not indicated. In this regard, the TPMI that is not indicated may be an arbitrary TPMI (e.g., 0) associated with a non codebook.

FIG. 7B is a diagram illustrating one example of a modified table associated with FIG. 7A. In the modified table, a field value 3 associated with the TPMI=3 of the existing table is changed to the TPMI=12 associated with the fully coherent codebook illustrated in FIG. 7A. In a case where the modified table in FIG. 7B is used, the number of bits of a precoding field does not increase from the number of bits of the existing table.

Figures 8A, 8B:
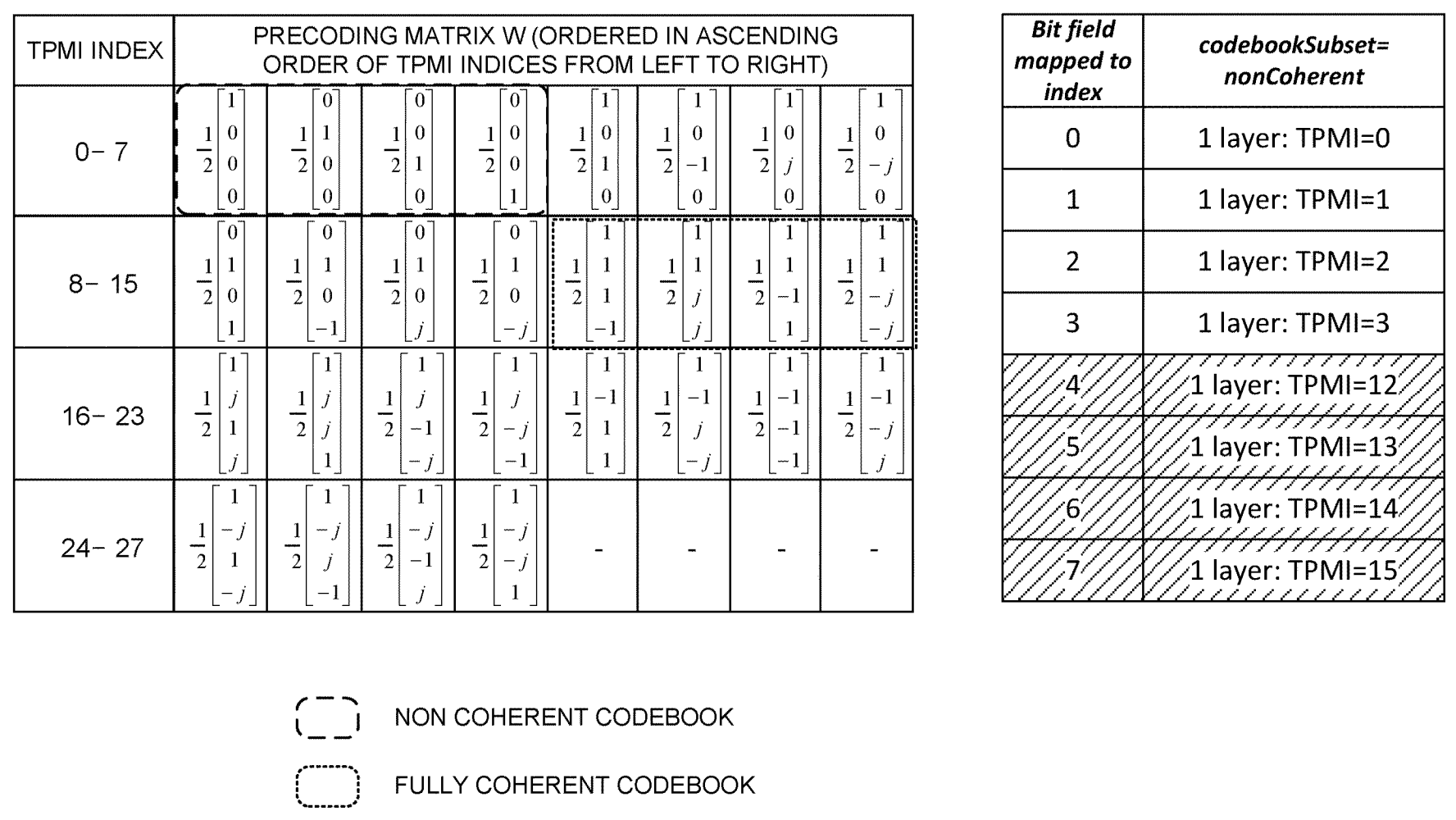

FIGS. 8A and 8B are diagrams illustrating a third example of notification of a TPMI to the non coherent UE that performs single layer transmission by using 4 antenna ports according to the first embodiment.

FIG. 8A differs from the example of FIG. 6A in that TPMIs=13 to 15 can be also indicated in addition to the TPMI=12 associated with the fully coherent codebook.

FIG. 8B is a diagram illustrating one example of a modified table associated with FIG. 8A. In the modified table, field values 5 to 7 associated with "Reserved" in FIG. 6B are changed so as to be associated with the TPMIs=13 to 15, respectively.

Figures 9A, 9B:
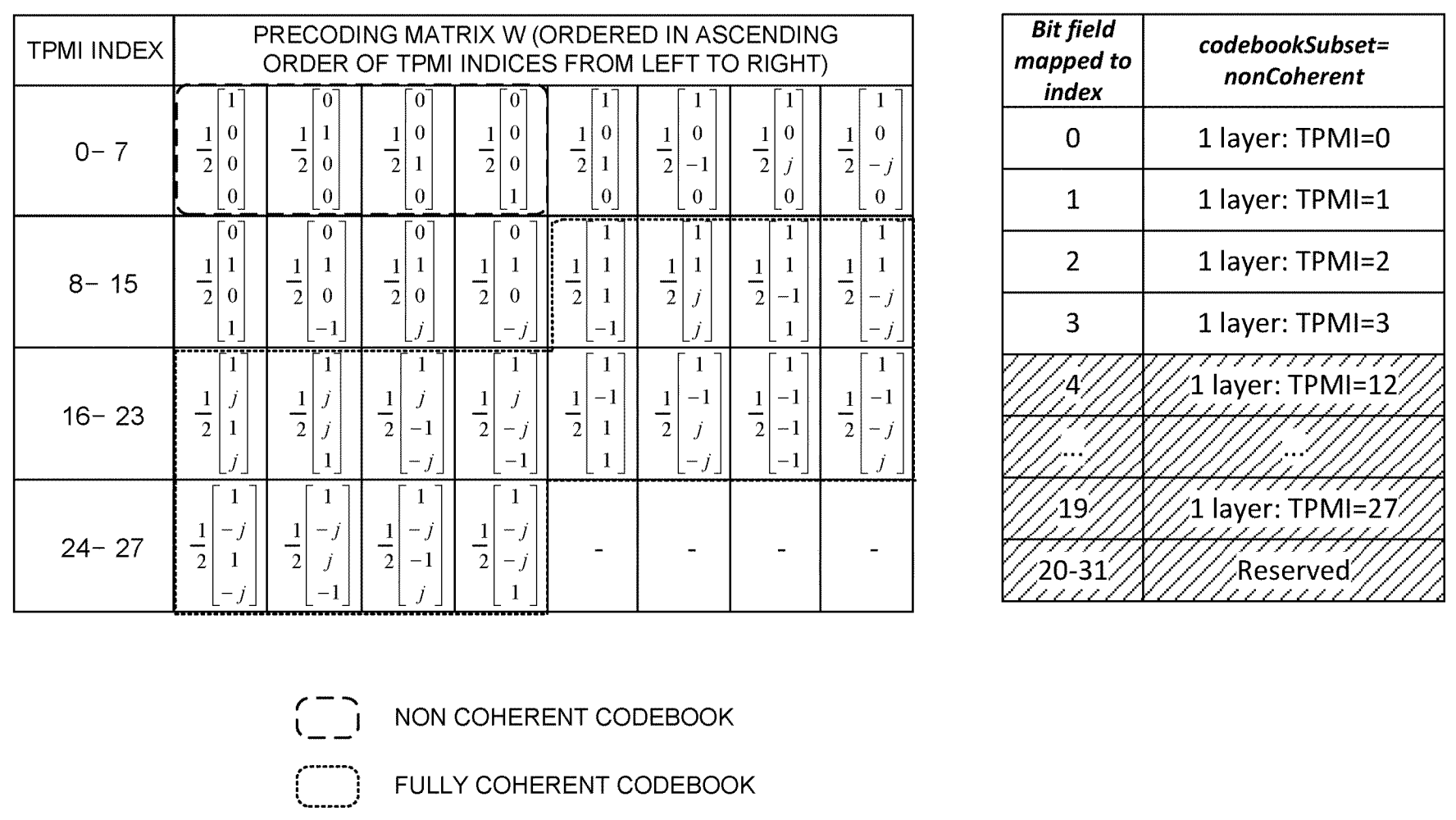

FIGS. 9A and 9B are diagrams illustrating a fourth example of notification of a TPMI to the non coherent UE that performs single layer transmission by using 4 antenna ports according to the first embodiment.

FIG. 9A differs from the example of FIG. 6A in that all TPMIs (TPMIs=12 to 27) associated with the fully coherent codebook can be indicated.

FIG. 9B is a diagram illustrating one example of a modified table associated with FIG. 5A. In FIG. 9B, the precoding field is 5 bits, and 0 to 31 can be indicated as a value.

The TPMIs (=12 to 27) associated with the fully coherent codebook illustrated in FIG. 9A are associated with values (=4 to 19) of an enhanced field in FIG. 9B.

Figures 10A, 10B:
FIGS. 10A and 10B are diagrams illustrating a first example of notification of a TPMI to a partial non coherent UE that performs single layer transmission by using 4 antenna ports according to the first embodiment.

FIGS. 10A and 10B are diagrams illustrating a first example of notification of a TPMI to the partial non coherent UE that performs single layer transmission by using 4 antenna ports according to the first embodiment.

As illustrated in FIG. 10A, a TPMI=12 associated with part of the fully coherent codebook other than TPMIs=0 to 11 that can be indicated to the partial coherent UE that performs single layer transmission by using 4 antenna ports according to legacy Rel-15 NR can be also indicated to the UE.

FIG. 10B is a diagram illustrating one example of a modified table associated with FIG. 10A. For the partial coherent UE that performs single layer transmission by using 4 antenna ports according to legacy Rel-15 NR, the precoding field is 4 bits, and 0 to 15 can be indicated as a value. In FIG. 10B, too, the precoding field is expressed as the same number of bits. In addition, "codebookSubset=partialAndNonCoherent" is described to indicate a table that the partial coherent UE refers to.

The field value 12 in FIG. 10B is modified so as to be associated with a TPMI (=12) of the fully coherent book illustrated in FIG. 10A.

FIGS. 11A and 11B are diagrams illustrating a second example of notification of a TPMI to the partial non coherent UE that performs single layer transmission by using the 4 antenna ports according to the first embodiment.

FIG. 11A differs from the example of FIG. 10A in that TPMIs=13 to 15 can be also indicated in addition to the TPMI=12 associated with the fully coherent codebook.

FIG. 11B is a diagram illustrating one example of a modified table associated with FIG. 11A. In the modified table, field values 13 to 15 associated with "Reserved" in FIG. 10B are changed so as to be associated with the TPMIs=13 to 15, respectively.

FIGS. 12A and 12B are diagrams illustrating a third example of notification of a TPMI to the partial non coherent UE that performs single layer transmission by using the 4 antenna ports according to the first embodiment.

FIG. 12A differs from the example of FIG. 10A in that all TPMIs (TPMIs=12 to 27) associated with the fully coherent codebook can be indicated.

FIG. 12B is a diagram illustrating one example of a modified table associated with FIG. 12A. In FIG. 12B, the precoding field is 5 bits, and 0 to 31 can be indicated as a value.

The TPMIs (=12 to 27) associated with the fully coherent codebook illustrated in FIG. 12A are associated with values (=12 to 27) of an enhanced field in FIG. 12B.

In addition, a modified table of FIG. 12B is the same as the existing table that the fully coherent UE refers to. That is, according to the first embodiment, it may be assumed that the partial coherent UE that supports full power transmission refers to the same association (table) between a precoding field and a TPMI as that of the fully coherent UE.

Figure 13:
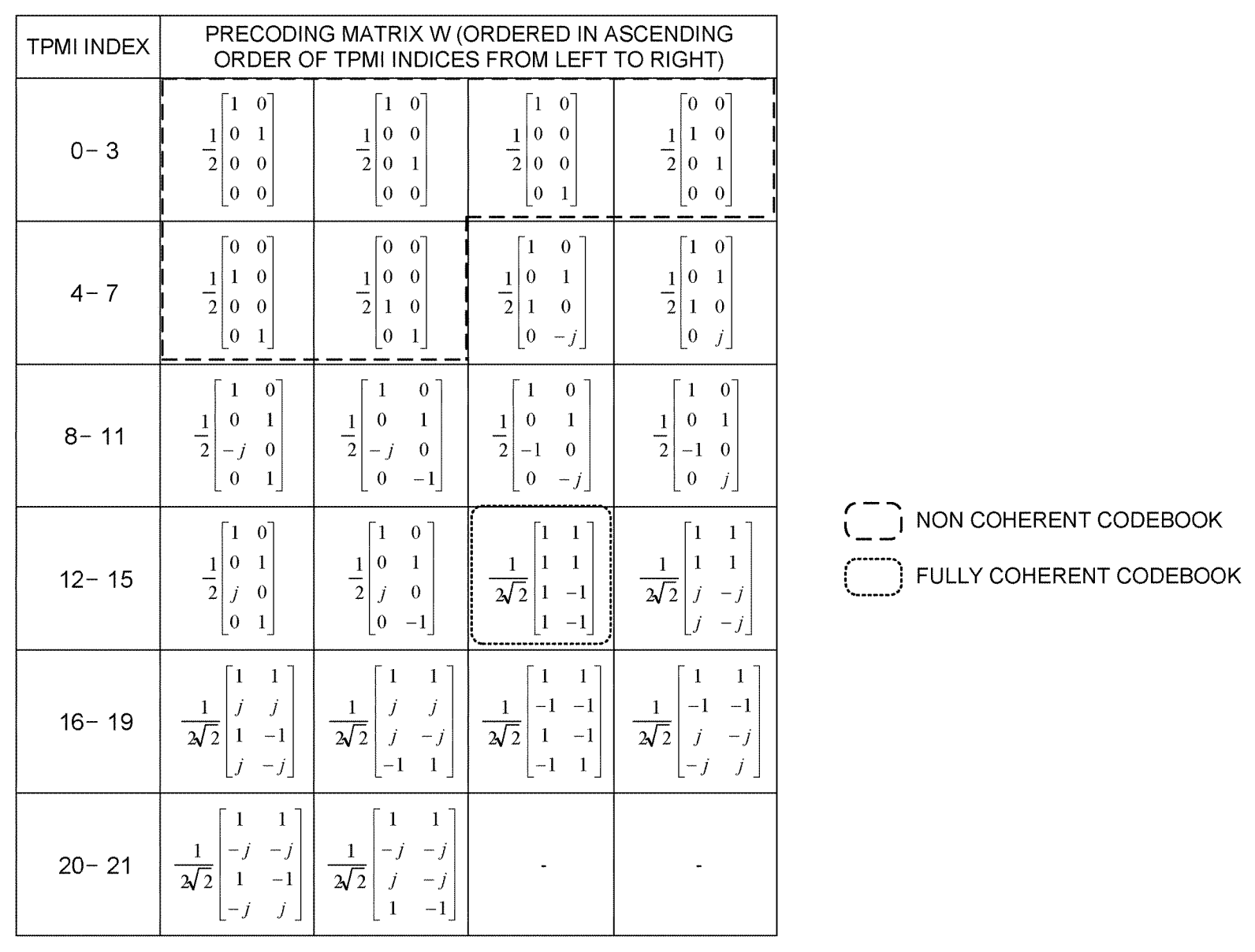

FIG. 13 is a diagram illustrating a first example of notification of a TPMI to the non coherent UE that performs 2-layer transmission by using 4 antenna ports according to the first embodiment. The precoding matrix W in FIG. 13 corresponds to a case where transform precoding is disabled. However, the present disclosure is applicable to a case, too, where transform precoding is enabled.

As illustrated in FIG. 13, a TPMI=14 associated with part of the fully coherent codebook other than TPMIs=0 to 5 that can be indicated to the non coherent UE that performs 2-layer transmission by using 4 antenna ports according to legacy Rel-15 NR can be also indicated to the UE. The modified table associated with this example may be a table created by enhancing, changing or modifying the existing table as described above, and therefore description thereof will be omitted.

Figure 14:
FIG. 14 is a diagram illustrating a second example of notification of a TPMI to a non coherent UE that performs 2-layer transmission by using the 4 antenna ports according to the first embodiment.

FIG. 14 is a diagram illustrating a second example of notification of a TPMI to the non coherent UE that performs 2-layer transmission by using the 4 antenna ports according to the first embodiment.

FIG. 14 differs from the example of FIG. 13 in that all TPMIs (TPMIs=14 to 21) associated with the fully coherent codebook can be indicated.

According to the above-described first embodiment, even the non coherent UE and the partial coherent UE can appropriately perform full power transmission by using a codebook subset for fully coherent.

Second Embodiment

According to the second embodiment, a UE may decide the number of bits of a precoding field of DCI based on whether or not a transform precoder is enabled, a maximum number of ranks, a codebook subset, UE capability (e.g., capability that indicates that UL full transmission capability is supported such as UE capability 2) related to UL full power transmission or configuration information (e.g., configuration information that enables UL full power transmission (for the UE capability 2)) related to UL full power transmission.

Furthermore, according to the second embodiment, the UE may decide a TPMI associated with a precoding field of DCI based on a table (that may be referred to as a modified table) that is, for example, enhanced, changed or modified from a table (that may be referred to as an existing table) that is referred to in a case of the same transform precoder, the same maximum number of ranks and the same codebook subset as those of legacy Rel-15 NR.

The UE may assume that the number of bits of the precoding field included in the above DCI is larger than, equal to or smaller than the number of bits of a precoding field according to legacy Rel-15 NR, and all values of the precoding field are associated with TPMIs of the fully coherent codebook (Reserved may be included).

In addition, the number of bits of the existing precoding field may be the number of bits that is determined based on whether or not a transform precoder is enabled, the maximum number of ranks and a codebook subset.

FIGS. 15A and 15B are diagrams illustrating a first example of notification of a TPMI to the non coherent UE that performs single layer transmission by using 2 antenna ports according to the second embodiment.

As illustrated in FIG. 15A, while TMPIs=0 and 1 that can be indicated to the non coherent UE that performs single layer transmission by using 2 antenna ports according to legacy Rel-15 NR are not indicated to the UE, a TMPI=2 associated with part of the fully coherent codebook can be indicated to the UE.

FIG. 15B is a diagram illustrating one example of a modified table associated with FIG. 15A. In the modified table, each field value of the existing table is changed so as to be each associated with the fully coherent codebook (a TPMI=2 in this example) (or "Reserved"). In a case where the modified table that can indicate only the fully coherent codebook is used as in FIG. 15B, even non coherent UE can perform full power UL transmission by using a non coherent antenna at all times.

FIGS. 16A and 16B are diagrams illustrating a second example of notification of a TPMI to the non coherent UE that performs single layer transmission by using the 2 antenna ports according to the second embodiment.

FIG. 16A differs from the example of FIG. 15A in that the TPMI=3 can be also indicated.

FIG. 16B is a diagram illustrating one example of a modified table associated with FIG. 16A. In the modified table, a field value 1 associated with "Reserved" in the existing table is changed to a TPMI=3 illustrated in FIG. 16A.

FIGS. 17A and 17B are diagrams illustrating a third example of notification of a TPMI to the non coherent UE that performs single layer transmission by using the 2 antenna ports according to the second embodiment.

FIG. 17A differs from the example of FIG. 15A in that all TPMIs (TPMIs=2 to 5) associated with the fully coherent codebook can be indicated.

FIG. 17B is a diagram illustrating one example of a modified table associated with FIG. 17A. In FIG. 17B, the precoding field is 2 bits, and 0 to 3 can be indicated as a value.

TPMIs (=2 to 5) associated with the fully coherent codebook illustrated in FIG. 17A are associated with values (=0 to 3) of an enhanced field in FIG. 17B. In a case where the modified table that can indicate a plurality of fully coherent codebooks are used as in FIG. 17B, it is possible to use the fully coherent codebooks of different phases. Consequently, by indicating to the UE a codebook that makes a channel correlation between antennas little, it is possible to expect improvement of a gain of full power transmission.

FIGS. 18A and 18B are diagrams illustrating a first example of notification of a TPMI to the non coherent UE that performs single layer transmission by using 4 antenna ports according to the second embodiment. The precoding matrix W in FIG. 18A corresponds to a case where transform precoding is enabled. However, the present disclosure is applicable to a case, too, where transform precoding is disabled.

As illustrated in FIG. 18A, while TMPIs=0 to 3 that can be indicated to the non coherent UE that performs single layer transmission by using 4 antenna ports according to legacy Rel-15 NR are not indicated to the UE, a TMPI=12 associated with part of the fully coherent codebook can be indicated to the UE.

FIG. 18B is a diagram illustrating one example of a modified table associated with FIG. 18A. For the non coherent UE that performs single layer transmission by using 4 antenna ports according to legacy Rel-15 NR, the precoding field is 2 bits, and only 0 to 3 can be indicated as a value. In FIG. 18B, the precoding field is 1 bit, and 0 to 1 can be indicated as a value.

Figures 19A, 19B:
FIGS. 19A and 19B are diagrams illustrating a second example of notification of a TPMI to the non coherent UE that performs single layer transmission by using the 4 antenna ports according to the second embodiment.

FIGS. 19A and 19B are diagrams illustrating a second example of notification of a TPMI to the non coherent UE that performs single layer transmission by using 4 antenna ports according to the second embodiment.

FIG. 19A differs from the example of FIG. 18A in that TPMIs=13 to 15 can be also indicated in addition to the TPMI=12 associated with the fully coherent codebook.

FIG. 19B is a diagram illustrating one example of a modified table associated with FIG. 19A. In FIG. 19B, the precoding field is 2 bits, and 0 to 3 can be indicated as a value. TPMIs (=12 to 15) associated with the fully coherent codebook illustrated in FIG. 19A are associated with values (=0 to 3) of a modified and enhanced field in FIG. 19B.

FIGS. 20A and 20B are diagrams illustrating a third example of notification of a TPMI to the non coherent UE that performs single layer transmission by using 4 antenna ports according to the second embodiment.

FIG. 20A differs from the example of FIG. 18A in that all TPMIs (TPMIs=12 to 27) associated with the fully coherent codebook can be indicated.

FIG. 20B is a diagram illustrating one example of a modified table associated with FIG. 20A. In FIG. 20B, the precoding field is 4 bits, and 0 to 15 can be indicated as a value.

TPMIs (=12 to 27) associated with the fully coherent codebook illustrated in FIG. 20A are associated with values (=0 to 15) of a modified and enhanced field in FIG. 20B.

The TPMI notifications described with reference to FIGS. 18 to 20 may be applied to the partial coherent UE.

According to the above-described second embodiment, even the non coherent UE and the partial coherent UE can appropriately perform full power transmission by using a codebook subset for fully coherent.

<Others>

A configuration of the modified table (the association between the precoding field value and the TMPI/layer) in each of the above-described embodiments may be defined in advance by a specification, or may be configured to the UE by using a higher layer signaling (e.g., an RRC signaling, an MAC signaling or a combination of these signalings).

Configuration information of the configuration of the modified table notified by the higher layer signaling may include, for example, one of a corresponding field value, layer and TPMI value, or a sequence (that may be referred to as a list or a set) of a combination of the corresponding field value, layer and TPMI value). According to this configuration, it is possible to flexibly control a TPMI for full power transmission that the UE uses. For example, by preventing a plurality of UEs whose distances are close from using the same TPMI value, a network may differ a base station (or a beam direction) of each transmission destination, and prevent an interference.

Each of the above-described embodiments has described the examples of the TPMI notifications to, for example, the non coherent/partial coherent UEs that perform single layer transmission by using 2/4 antenna ports, and the non coherent UE that performs 2-layer transmission by using 4 antenna ports. However, application of the present disclosure is not limited to these. For example, the UE that performs n-layer (n represents a natural number such as n=1, 2, 3 and . . . ) by using m (m represents a natural number such as m=2, 4, and . . . ) antenna ports may use, for example, a configuration of a precoding field and a configuration of a modified table determined based on a rule similar to that described in the above-described first embodiment or second embodiment.

Furthermore, each of the above-described embodiments has described UL transmission that uses an antenna port by assuming a PUSCH. However, at least one full power transmission of another signal and channel may be controlled in addition to a PUSCH or instead of a PUSCH.

That is, the antenna port according to each of the above-described embodiments may be an antenna port of at least one of, for example, a PUSCH (or a DeModulation Reference Signal (DMRS) for the PUSCH), a Phase Tracking Reference Signal (PTRS), a Physical Uplink Control Channel (PUCCH), a Physical Random Access Channel (PRACH) and an SRS, and full power transmission may be applied to at least one of these signals and channels.

(New codebook subsets and modified tables described in) Each of the above-described embodiments may be introduced only for rank values that do not enable full power UL transmission.

(Radio Communication System)

The configuration of the radio communication system according to one embodiment of the present disclosure will be described below. This radio communication system uses one or a combination of the radio communication method according to each of the above embodiments of the present disclosure to perform communication.

Figure 21:
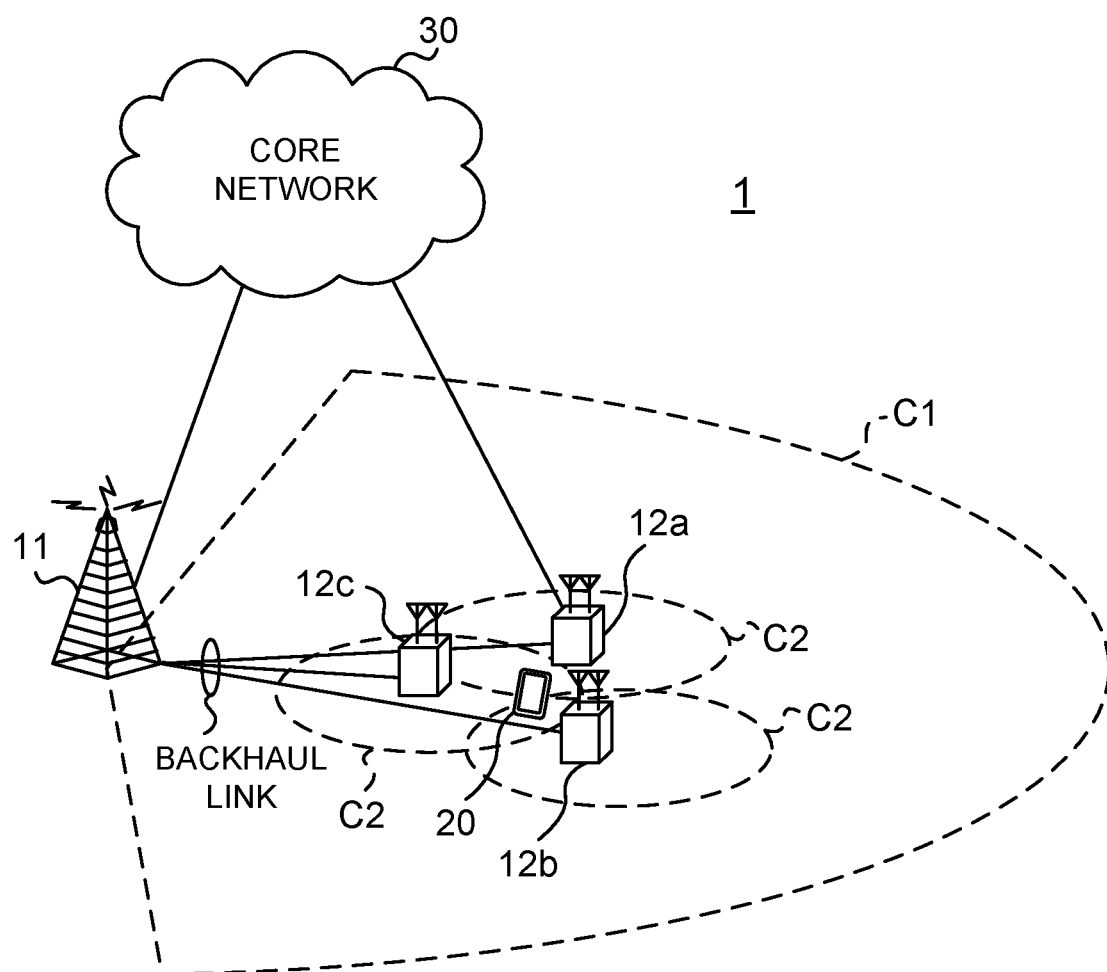
FIG. 21 is a diagram illustrating one example of a schematic configuration of a radio communication system according to one embodiment.

FIG. 21 is a diagram illustrating one example of a schematic configuration of the radio communication system according to the one embodiment. A radio communication system 1 may be a system that realizes communication by using Long Term Evolution (LTE) or the 5th generation mobile communication system New Radio (5G NR) specified by the Third Generation Partnership Project (3GPP).

Furthermore, the radio communication system 1 may support dual connectivity between a plurality of Radio Access Technologies (RATs) (Multi-RAT Dual Connectivity (MR-DC)). MR-DC may include dual connectivity (E-UTRA-NR Dual Connectivity (EN-DC)) of LTE (Evolved Universal Terrestrial Radio Access (E-UTRA)) and NR, and dual connectivity (NR-E-UTRA Dual Connectivity (NE-DC)) of NR and LTE.

According to EN-DC, a base station (eNB) of LTE (E-UTRA) is a Master Node (MN), and a base station (gNB) of NR is a Secondary Node (SN). According to NE-DC, a base station (gNB) of NR is an MN, and a base station (eNB) of LTE (E-UTRA) is an SN.

The radio communication system 1 may support dual connectivity between a plurality of base stations in an identical RAT (e.g., dual connectivity (NR-NR Dual Connectivity (NN-DC)) where both of the MN and the SN are base stations (gNBs) according to NR).

The radio communication system 1 may include a base station 11 that forms a macro cell C1 of a relatively wide coverage, and base stations 12 (12a to 12c) that are located in the macro cell C1 and form small cells C2 narrower than the macro cell C1. The user terminal 20 may be located in at least one cell. An arrangement and the numbers of respective cells and the user terminals 20 are not limited to the aspect illustrated in FIG. 21. The base stations 11 and 12 will be collectively referred to as a base station 10 below when not distinguished.

The user terminal 20 may connect with at least one of a plurality of base stations 10. The user terminal 20 may use at least one of Carrier Aggregation (CA) and Dual Connectivity (DC) that use a plurality of Component Carriers (CCs).

Each CC may be included in at least one of a first frequency range (Frequency Range 1 (FR 1)) and a second frequency range (Frequency Range 2 (FR 2)). The macro cell C1 may be included in the FR 1, and the small cell C2 may be included in the FR 2. For example, the FR 1 may be a frequency range equal to or less than 6 GHz (sub-6 GHz), and the FR 2 may be a frequency range higher than 24 GHz (above-24 GHz). In addition, the frequency ranges and definitions of the FR 1 and the FR 2 are not limited to these, and, for example, the FR 1 may correspond to a frequency range higher than the FR 2.

Furthermore, the user terminal 20 may perform communication by using at least one of Time Division Duplex (TDD) and Frequency Division Duplex (FDD) in each CC.

A plurality of base stations 10 may be connected by way of wired connection (e.g., optical fibers compliant with a Common Public Radio Interface (CPRI) or an X2 interface) or radio connection (e.g., NR communication). When, for example, NR communication is used as a backhaul between the base stations 11 and 12, the base station 11 corresponding to a higher station may be referred to as an Integrated Access Backhaul (IAB) donor, and the base station 12 corresponding to a relay station (relay) may be referred to as an JAB node.

The base station 10 may be connected with a core network 30 via the another base station 10 or directly. The core network 30 may include at least one of, for example, an Evolved Packet Core (EPC), a 5G Core Network (5GCN) and a Next Generation Core (NGC).

The user terminal 20 is a terminal that supports at least one of communication schemes such as LTE, LTE-A and 5G.

The radio communication system 1 may use an Orthogonal Frequency Division Multiplexing (OFDM)-based radio access scheme. For example, on at least one of Downlink (DL) and Uplink (UL), Cyclic Prefix OFDM (CP-OFDM), Discrete Fourier Transform Spread OFDM (DFT-s-OFDM), Orthogonal Frequency Division Multiple Access (OFDMA) and Single Carrier Frequency Division Multiple Access (SC-FDMA) may be used.

The radio access scheme may be referred to as a waveform. In addition, the radio communication system 1 may use another radio access scheme (e.g., another single carrier transmission scheme or another multicarrier transmission scheme) as the radio access scheme on UL and DL.

The radio communication system 1 may use a downlink shared channel (Physical Downlink Shared Channel (PDSCH)) shared by each user terminal 20, a broadcast channel (Physical Broadcast Channel (PBCH)) and a downlink control channel (Physical Downlink Control Channel (PDCCH)) as downlink channels.

Furthermore, the radio communication system 1 may use an uplink shared channel (Physical Uplink Shared Channel (PUSCH)) shared by each user terminal 20, an uplink control channel (Physical Uplink Control Channel (PUCCH)) and a random access channel (Physical Random Access Channel (PRACH)) as uplink channels.

User data, higher layer control information and a System Information Block (SIB) are conveyed on the PDSCH. The user data and the higher layer control information may be conveyed on the PUSCH. Furthermore, a Master Information Block (MIB) may be conveyed on the PBCH.

Lower layer control information may be conveyed on the PDCCH. The lower layer control information may include, for example, Downlink Control Information (DCI) including scheduling information of at least one of the PDSCH and the PUSCH.

In addition, DCI for scheduling the PDSCH may be referred to as, for example, a DL assignment or DL DCI, and DCI for scheduling the PUSCH may be referred to as, for example, a UL grant or UL DCI. In this regard, the PDSCH may be read as DL data, and the PUSCH may be read as UL data.

A COntrol REsource SET (CORESET) and a search space may be used to detect the PDCCH. The CORESET corresponds to a resource for searching DCI. The search space corresponds to a search domain and a search method of PDCCH candidates. One CORESET may be associated with one or a plurality of search spaces. The UE may monitor a CORESET associated with a certain search space based on a search space configuration.

One search space may be associated with a PDCCH candidate corresponding to one or a plurality of aggregation levels. One or a plurality of search spaces may be referred to as a search space set. In addition, a "search space", a "search space set", a "search space configuration", a "search space set configuration", a "CORESET" and a "CORESET configuration" in the present disclosure may be interchangeably read.

Uplink Control Information (UCI) including at least one of Channel State Information (CSI), transmission acknowledgement information (that may be referred to as, for example, Hybrid Automatic Repeat reQuest ACKnowledgement (HARQ-ACK) or ACK/NACK) and a Scheduling Request (SR) may be conveyed on the PUCCH. A random access preamble for establishing connection with a cell may be conveyed on the PRACH.

In addition, downlink and uplink in the present disclosure may be expressed without adding "link" thereto. Furthermore, various channels may be expressed without adding "physical" to heads of the various channels.

The radio communication system 1 may convey a Synchronization Signal (SS) and a Downlink Reference Signal (DL-RS). The radio communication system 1 may convey a Cell-specific Reference Signal (CRS), a Channel State Information Reference Signal (CSI-RS), a DeModulation Reference Signal (DMRS), a Positioning Reference Signal (PRS) and a Phase Tracking Reference Signal (PTRS) as DL-RSs.

The synchronization signal may be at least one of, for example, a Primary Synchronization Signal (PSS) and a Secondary Synchronization Signal (SSS). A signal block including the SS (the PSS or the SSS) and the PBCH (and the DMRS for the PBCH) may be referred to as, for example, an SS/PBCH block or an SS Block (SSB). In addition, the SS and the SSB may be also referred to as reference signals.

Furthermore, the radio communication system 1 may convey a Sounding Reference Signal (SRS) and a DeModulation Reference Signal (DMRS) as UpLink Reference Signals (UL-RSs). In this regard, the DMRS may be referred to as a user terminal-specific reference signal (UE-specific reference signal).

(Base Station)

Figure 22:
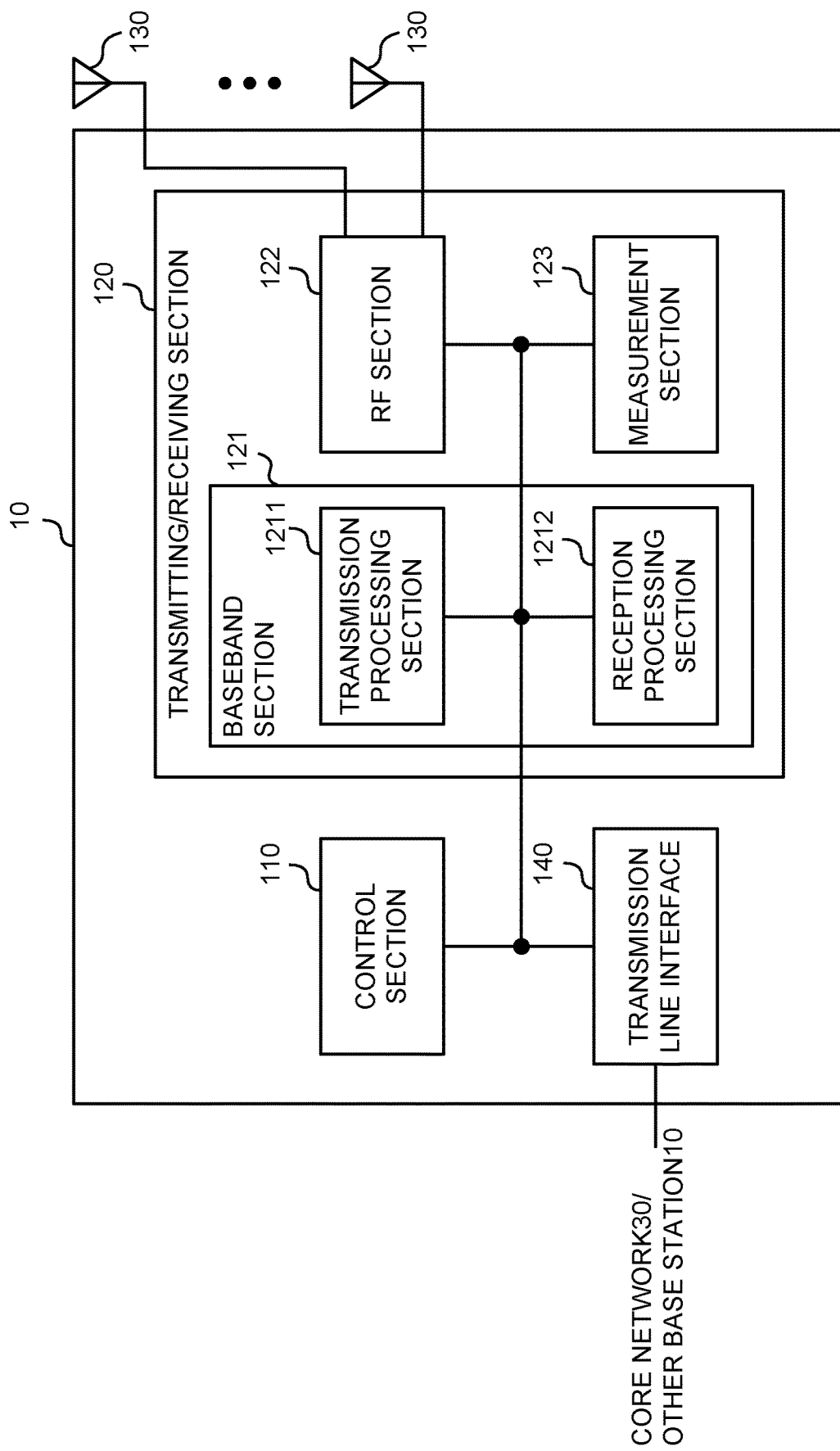
FIG. 22 is a diagram illustrating one example of a configuration of a base station according to the one embodiment.

FIG. 22 is a diagram illustrating one example of a configuration of the base station according to the one embodiment. The base station 10 includes a control section 110, a transmitting/receiving section 120, transmission/reception antennas 130 and a transmission line interface 140. In addition, the base station 10 may include one or more of each of the control sections 110, the transmitting/receiving sections 120, the transmission/reception antennas 130 and the transmission line interfaces 140.

In addition, this example mainly illustrates function blocks of characteristic portions according to the present embodiment, and may assume that the base station 10 includes other function blocks, too, that are necessary for radio communication. Part of processing of each section described below may be omitted.

The control section 110 controls the entire base station 10. The control section 110 can be composed of a controller or a control circuit described based on the common knowledge in the technical field according to the present disclosure.

The control section 110 may control signal generation and scheduling (e.g., resource allocation or mapping). The control section 110 may control transmission/reception and measurement that use the transmitting/receiving section 120, the transmission/reception antennas 130 and the transmission line interface 140. The control section 110 may generate data, control information or a sequence to be transmitted as a signal, and forward the signal to the transmitting/receiving section 120. The control section 110 may perform call processing (such as configuration and release) of a communication channel, state management of the base station 10 and radio resource management.

The transmitting/receiving section 120 may include a baseband section 121, a Radio Frequency (RF) section 122 and a measurement section 123. The baseband section 121 may include a transmission processing section 1211 and a reception processing section 1212. The transmitting/receiving section 120 can be composed of a transmitter/receiver, an RF circuit, a baseband circuit, a filter, a phase shifter, a measurement circuit and a transmission/reception circuit described based on the common knowledge in the technical field according to the present disclosure.

The transmitting/receiving section 120 may be composed as an integrated transmitting/receiving section, or may be composed of a transmitting section and a receiving section. The transmitting section may be composed of the transmission processing section 1211 and the RF section 122. The receiving section may be composed of the reception processing section 1212, the RF section 122 and the measurement section 123.

The transmission/reception antenna 130 can be composed of an antenna such as an array antenna described based on the common knowledge in the technical field according to the present disclosure.

The transmitting/receiving section 120 may transmit the above-described downlink channel, synchronization signal and downlink reference signal. The transmitting/receiving section 120 may receive the above-described uplink channel and uplink reference signal.

The transmitting/receiving section 120 may form at least one of a transmission beam and a reception beam by using digital beam forming (e.g., precoding) or analog beam forming (e.g., phase rotation).

The transmitting/receiving section 120 (transmission processing section 1211) may perform Packet Data Convergence Protocol (PDCP) layer processing, Radio Link Control (RLC) layer processing (e.g., RLC retransmission control), and Medium Access Control (MAC) layer processing (e.g., HARQ retransmission control) on, for example, the data and the control information obtained from the control section 110, and generate a bit sequence to transmit.

The transmitting/receiving section 120 (transmission processing section 1211) may perform transmission processing such as channel coding (that may include error correction coding), modulation, mapping, filter processing, Discrete Fourier Transform (DFT) processing (when needed), Inverse Fast Fourier Transform (IFFT) processing, precoding and digital-analog conversion on the bit sequence to transmit, and output a baseband signal.

The transmitting/receiving section 120 (RF section 122) may modulate the baseband signal into a radio frequency range, perform filter processing and amplification on the signal, and transmit the signal of the radio frequency range via the transmission/reception antennas 130.

On the other hand, the transmitting/receiving section 120 (RF section 122) may perform amplification and filter processing on the signal of the radio frequency range received by the transmission/reception antennas 130, and demodulate the signal into a baseband signal.

The transmitting/receiving section 120 (reception processing section 1212) may apply reception processing such as analog-digital conversion, Fast Fourier Transform (FFT) processing, Inverse Discrete Fourier Transform (IDFT) processing (when needed), filter processing, demapping, demodulation, decoding (that may include error correction decoding), MAC layer processing, RLC layer processing and PDCP layer processing to the obtained baseband signal, and obtain user data.

The transmitting/receiving section 120 (measurement section 123) may perform measurement related to the received signal. For example, the measurement section 123 may perform Radio Resource Management (RRM) measurement or Channel State Information (CSI) measurement based on the received signal. The measurement section 123 may measure received power (e.g., Reference Signal Received Power (RSRP)), received quality (e.g., Reference Signal Received Quality (RSRQ), a Signal to Interference plus Noise Ratio (SINR) or a Signal to Noise Ratio (SNR)), a signal strength (e.g., a Received Signal Strength Indicator (RSSI)) or channel information (e.g., CSI). The measurement section 123 may output a measurement result to the control section 110.

The transmission line interface 140 may transmit and receive (backhaul signaling) signals to and from apparatuses and the other base stations 10 included in the core network 30, and obtain and convey user data (user plane data) and control plane data for the user terminal 20.

In addition, the transmitting section and the receiving section of the base station 10 according to the present disclosure may be composed of at least one of the transmitting/receiving section 120, the transmission/reception antenna 130 and the transmission line interface 140.

In addition, when receiving capability information that indicates that full power transmission is supported from the user terminal 20, and when a non coherent, or partial and non coherent codebook subsets are configured to the user terminal, the transmitting/receiving section 120 may indicate a fully coherent codebook subset by Downlink Control Information (DCI).

(User Terminal)

Figure 23:
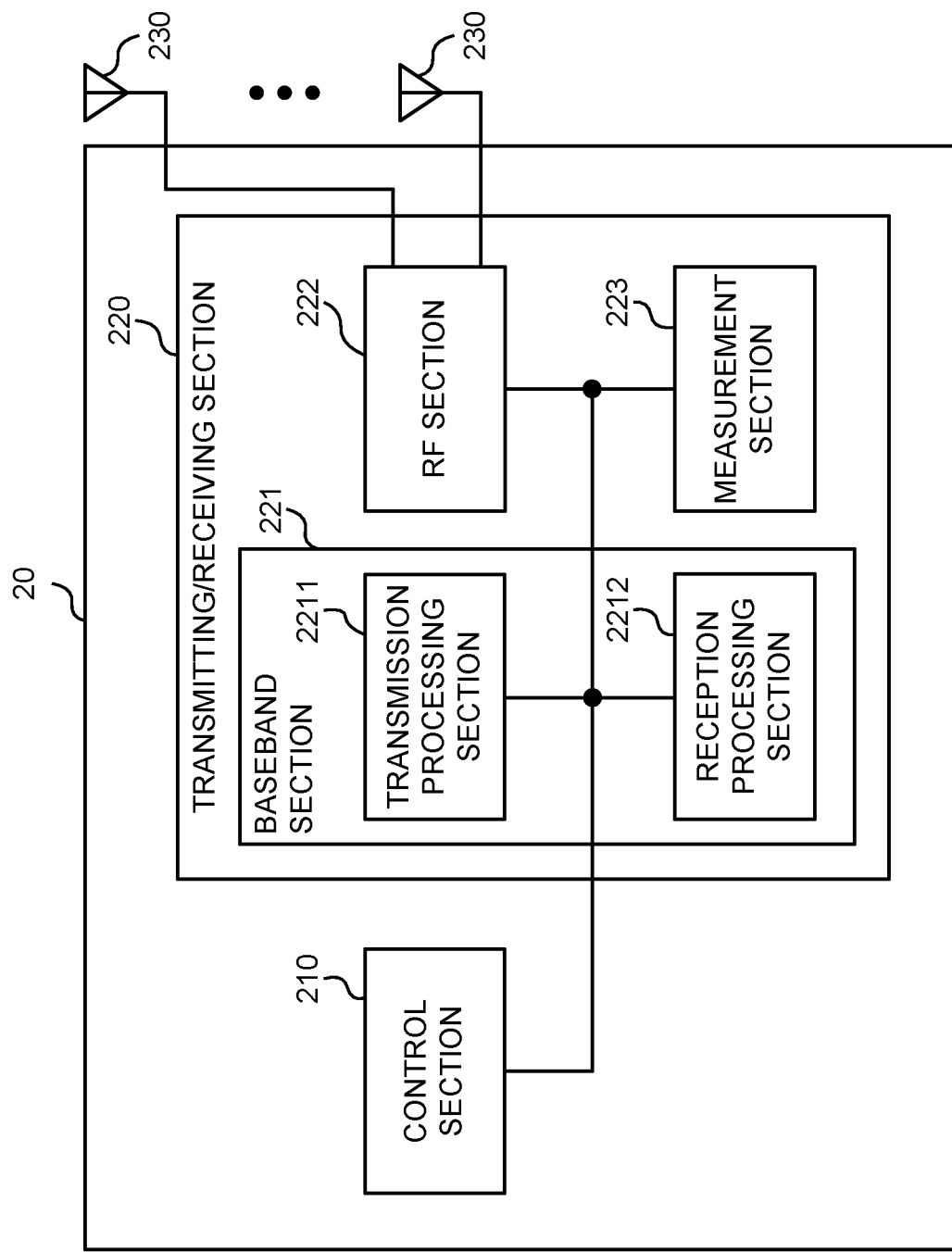
FIG. 23 is a diagram illustrating one example of a configuration of a user terminal according to the one embodiment.

FIG. 23 is a diagram illustrating one example of a configuration of the user terminal according to the one embodiment. The user terminal 20 includes a control section 210, a transmitting/receiving section 220 and transmission/reception antennas 230. In this regard, the user terminal 20 may include one or more of each of the control sections 210, the transmitting/receiving sections 220 and the transmission/reception antennas 230.

In addition, this example mainly illustrates function blocks of characteristic portions according to the present embodiment, and may assume that the user terminal 20 includes other function blocks, too, that are necessary for radio communication. Part of processing of each section described below may be omitted.

The control section 210 controls the entire user terminal 20. The control section 210 can be composed of a controller or a control circuit described based on the common knowledge in the technical field according to the present disclosure.

The control section 210 may control signal generation and mapping. The control section 210 may control transmission/reception and measurement that use the transmitting/receiving section 220 and the transmission/reception antennas 230. The control section 210 may generate data, control information or a sequence to be transmitted as a signal, and forward the signal to the transmitting/receiving section 220.

The transmitting/receiving section 220 may include a baseband section 221, an RF section 222 and a measurement section 223. The baseband section 221 may include a transmission processing section 2211 and a reception processing section 2212. The transmitting/receiving section 220 can be composed of a transmitter/receiver, an RF circuit, a baseband circuit, a filter, a phase shifter, a measurement circuit and a transmission/reception circuit described based on the common knowledge in the technical field according to the present disclosure.

The transmitting/receiving section 220 may be composed as an integrated transmitting/receiving section, or may be composed of a transmitting section and a receiving section. The transmitting section may be composed of the transmission processing section 2211 and the RF section 222. The receiving section may be composed of the reception processing section 2212, the RF section 222 and the measurement section 223.

The transmission/reception antenna 230 can be composed of an antenna such as an array antenna described based on the common knowledge in the technical field according to the present disclosure.

The transmitting/receiving section 220 may receive the above-described downlink channel, synchronization signal and downlink reference signal. The transmitting/receiving section 220 may transmit the above-described uplink channel and uplink reference signal.

The transmitting/receiving section 220 may form at least one of a transmission beam and a reception beam by using digital beam forming (e.g., precoding) or analog beam forming (e.g., phase rotation).

The transmitting/receiving section 220 (transmission processing section 2211) may perform PDCP layer processing, RLC layer processing (e.g., RLC retransmission control) and MAC layer processing (e.g., HARQ retransmission control) on, for example, the data and the control information obtained from the control section 210, and generate a bit sequence to transmit.

The transmitting/receiving section 220 (transmission processing section 2211) may perform transmission processing such as channel coding (that may include error correction coding), modulation, mapping, filter processing, DFT processing (when needed), IFFT processing, precoding and digital-analog conversion on the bit sequence to transmit, and output a baseband signal.

In this regard, whether or not to apply the DFT processing may be based on a configuration of transform precoding. When transform precoding is enabled for a certain channel (e.g., PUSCH), the transmitting/receiving section 220 (transmission processing section 2211) may perform the DFT processing as the above transmission processing to transmit the certain channel by using a DFT-s-OFDM waveform. When precoding is not enabled, the transmitting/receiving section 220 (transmission processing section 2211) may not perform the DFT processing as the above transmission processing.

The transmitting/receiving section 220 (RF section 222) may modulate the baseband signal into a radio frequency range, perform filter processing and amplification on the signal, and transmit the signal of the radio frequency range via the transmission/reception antennas 230.

On the other hand, the transmitting/receiving section 220 (RF section 222) may perform amplification and filter processing on the signal of the radio frequency range received by the transmission/reception antennas 230, and demodulate the signal into a baseband signal.

The transmitting/receiving section 220 (reception processing section 2212) may apply reception processing such as analog-digital conversion, FFT processing, IDFT processing (when needed), filter processing, demapping, demodulation, decoding (that may include error correction decoding), MAC layer processing, RLC layer processing and PDCP layer processing to the obtained baseband signal, and obtain user data.

The transmitting/receiving section 220 (measurement section 223) may perform measurement related to the received signal. For example, the measurement section 223 may perform, for example, RRM measurement or CSI measurement based on the received signal. The measurement section 223 may measure, for example, received power (e.g., RSRP), received quality (e.g., RSRQ, an SINR or an SNR), a signal strength (e.g., RSSI) or channel information (e.g., CSI). The measurement section 223 may output a measurement result to the control section 210.

In addition, the transmitting section and the receiving section of the user terminal 20 according to the present disclosure may be composed of at least one of the transmitting/receiving section 220 and the transmission/reception antenna 230.

In addition, the control section 210 may assume that, when the capability information that indicates that full power transmission is supported is transmitted, and a non coherent (e.g., RRC parameter "codebookSubset"="nonCoherent") or partial and non coherent (e.g., RRC parameter "codebookSubset"="partialAndNonCoherent") codebook subsets are configured (in other words, the fully coherent codebook subset is not configured), the fully coherent codebook subset can be indicated by the Downlink Control Information (DCI).

The transmitting/receiving section 220 may perform full power transmission by applying the fully coherent codebook subset to uplink transmission (e.g., PUSCH) based on the downlink control information. The transmitting/receiving section 220 may perform full power transmission by applying Cyclic Delay Diversity (CDD) that is based on the cyclic delay to the uplink transmission. In this regard, the full power transmission may mean that total transmission power of antenna ports indicated by the precoding matrix match maximum transmission power of the user terminal 20.

The control section 210 may assume that one of the fully coherent codebook subset and other codebook subsets (a non coherent codebook subset and a partial coherent codebook subset) can be indicated according to a value of a given field (e.g., precoding field) of the downlink control information.

The control section 210 may assume that only the fully coherent codebook subset (or only the fully coherent codebook subset and "Reserved") can be indicated according to the value of the given field of the downlink control information.

The control section 210 may assume that a plurality of these fully coherent codebook subsets (all of which are, for example, related to a certain rank) can be indicated according to the value of the given field of the downlink control information.

In addition, the codebook subsets according to the present disclosure may mean codebook subsets in a case of, for example, a specific transform precoder (e.g., whether or not there is the specific transform precoder) and a specific number of ranks.

(Hardware Configuration)

In addition, the block diagrams used to describe the above embodiments illustrate blocks in function units. These function blocks (components) are realized by an arbitrary combination of at least ones of hardware components and software components. Furthermore, a method for realizing each function block is not limited in particular. That is, each function block may be realized by using one physically or logically coupled apparatus or may be realized by connecting two or more physically or logically separate apparatuses directly or indirectly (by using, for example, wired connection or radio connection) and using a plurality of these apparatuses. Each function block may be realized by combining software with the above one apparatus or a plurality of above apparatuses.

In this regard, the functions include deciding, determining, judging, calculating, computing, processing, deriving, investigating, looking up, ascertaining, receiving, transmitting, outputting, accessing, resolving, selecting, choosing, establishing, comparing, assuming, expecting, considering, broadcasting, notifying, communicating, forwarding, configuring, reconfiguring, allocating, mapping, and assigning, yet are not limited to these. For example, a function block (component) that causes transmission to function may be referred to as, for example, a transmitting unit or a transmitter. As described above, the method for realizing each function block is not limited in particular.

Figure 24:
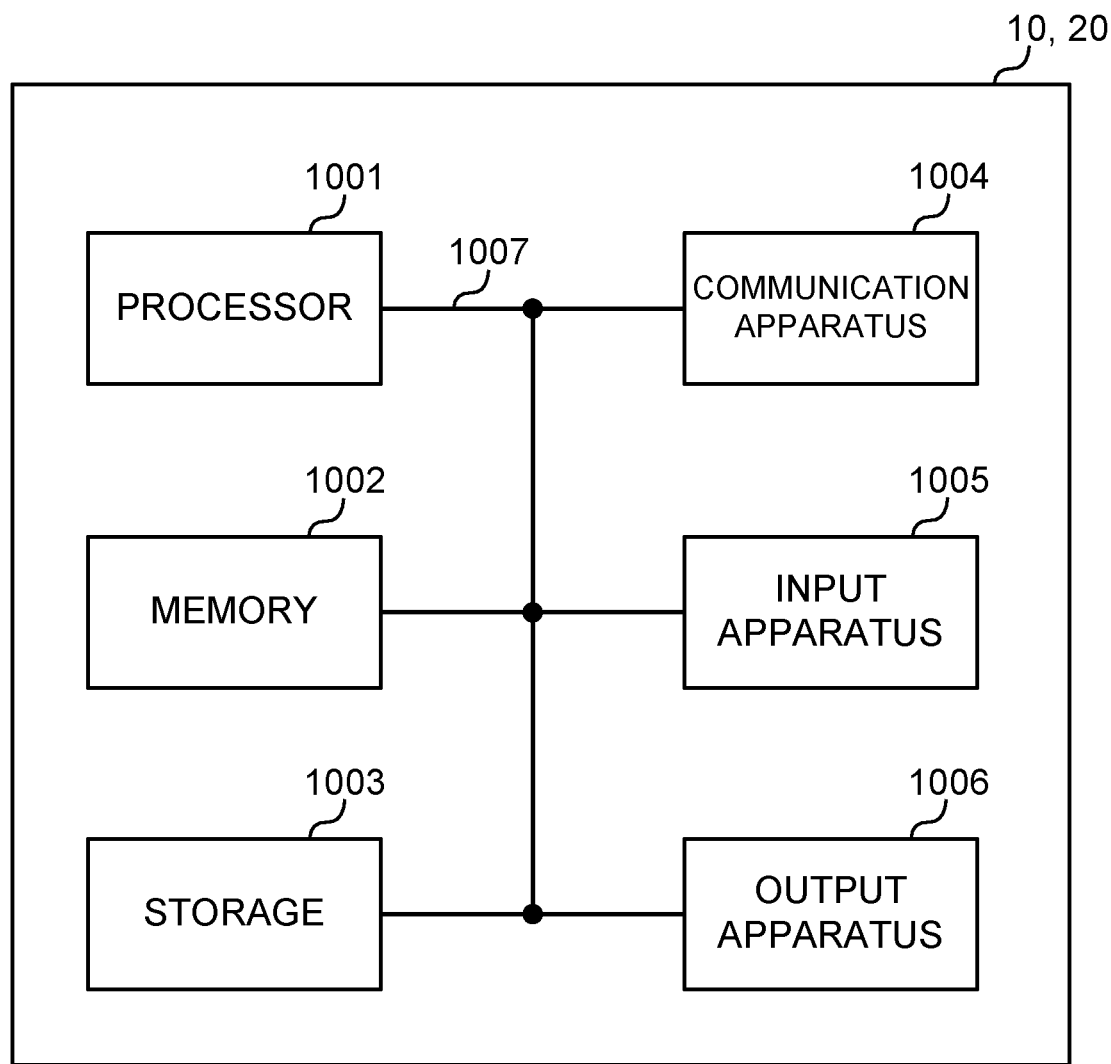
FIG. 24 is a diagram illustrating one example of hardware configurations of the base station and the user terminal according to the one embodiment.

For example, the base station and the user terminal according to the one embodiment of the present disclosure may function as computers that perform processing of the radio communication method according to the present disclosure. FIG. 24 is a diagram illustrating one example of the hardware configurations of the base station and the user terminal according to the one embodiment. The above-described base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, words such as an apparatus, a circuit, a device, a section and a unit in the present disclosure can be interchangeably read. The hardware configurations of the base station 10 and the user terminal 20 may be configured to include one or a plurality of apparatuses illustrated in FIG. 24 or may be configured without including part of the apparatuses.

For example, FIG. 24 illustrates the only one processor 1001. However, there may be a plurality of processors. Furthermore, processing may be executed by 1 processor or processing may be executed by 2 or more processors simultaneously or successively or by using another method. In addition, the processor 1001 may be implemented by 1 or more chips.

Each function of the base station 10 and the user terminal 20 is realized by, for example, causing hardware such as the processor 1001 and the memory 1002 to read given software (program), and thereby causing the processor 1001 to perform an operation, and control communication via the communication apparatus 1004 and control at least one of reading and writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, at least part of the above-described control section 110 (210) and transmitting/receiving section 120 (220) may be realized by the processor 1001.

Furthermore, the processor 1001 reads programs (program codes), software modules or data from at least one of the storage 1003 and the communication apparatus 1004 out to the memory 1002, and executes various types of processing according to these programs, software modules or data. As the programs, programs that cause the computer to execute at least part of the operations described in the above-described embodiments are used. For example, the control section 110 (210) may be realized by a control program that is stored in the memory 1002 and operates on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as, for example, a register, a cache or a main memory (main storage apparatus). The memory 1002 can store programs (program codes) and software modules that can be executed to perform the radio communication method according to the one embodiment of the present disclosure.

The storage 1003 is a computer-readable recording medium, and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via at least one of a wired network and a radio network, and is also referred to as, for example, a network device, a network controller, a network card and a communication module. The communication apparatus 1004 may be configured to include a high frequency switch, a duplexer, a filter and a frequency synthesizer to realize at least one of, for example, Frequency Division Duplex (FDD) and Time Division Duplex (TDD). For example, the above-described transmitting/receiving section 120 (220) and transmission/reception antennas 130 (230) may be realized by the communication apparatus 1004. The transmitting/receiving section 120 (220) may be physically or logically separately implemented as a transmitting section 120*a* (220*a*) and a receiving section 120*b* (220*b*).

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed by using a single bus or may be composed by using different buses between apparatuses.

Furthermore, the base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may be used to realize part or entirety of each function block. For example, the processor 1001 may be implemented by using at least one of these hardware components.

Modified Example

In addition, each term that has been described in the present disclosure and each term that is necessary to understand the present disclosure may be replaced with terms having identical or similar meanings. For example, a channel, a symbol and a signal (a signal or a signaling) may be interchangeably read. Furthermore, a signal may be a message. A reference signal can be also abbreviated as an RS, or may be referred to as a pilot or a pilot signal depending on standards to be applied. Furthermore, a Component Carrier (CC) may be referred to as, for example, a cell, a frequency carrier and a carrier frequency.

A radio frame may include one or a plurality of durations (frames) in a time domain. Each of one or a plurality of durations (frames) that makes up a radio frame may be referred to as a subframe. Furthermore, the subframe may include one or a plurality of slots in the time domain. The subframe may be a fixed time duration (e.g., 1 ms) that does not depend on a numerology.

In this regard, the numerology may be a communication parameter to be applied to at least one of transmission and reception of a certain signal or channel. The numerology may indicate at least one of, for example, a SubCarrier Spacing (SCS), a bandwidth, a symbol length, a cyclic prefix length, a Transmission Time Interval (TTI), the number of symbols per TTI, a radio frame configuration, specific filtering processing performed by a transceiver in a frequency domain, and specific windowing processing performed by the transceiver in a time domain.

The slot may include one or a plurality of symbols (Orthogonal Frequency Division Multiplexing (OFDM) symbols or Single Carrier Frequency Division Multiple Access (SC-FDMA) symbols) in the time domain. Furthermore, the slot may be a time unit based on the numerology.

The slot may include a plurality of mini slots. Each mini slot may include one or a plurality of symbols in the time domain. Furthermore, the mini slot may be referred to as a subslot. The mini slot may include a smaller number of symbols than that of the slot. The PDSCH (or the PUSCH) to be transmitted in larger time units than that of the mini slot may be referred to as a PDSCH (PUSCH) mapping type A. The PDSCH (or the PUSCH) to be transmitted by using the mini slot may be referred to as a PDSCH (PUSCH) mapping type B.

The radio frame, the subframe, the slot, the mini slot and the symbol each indicate a time unit for conveying signals. The other corresponding names may be used for the radio frame, the subframe, the slot, the mini slot and the symbol.

In addition, time units such as a frame, a subframe, a slot, a mini slot and a symbol in the present disclosure may be interchangeably read.

For example, 1 subframe may be referred to as a TTI, a plurality of contiguous subframes may be referred to as TTIs, or 1 slot or 1 mini slot may be referred to as a TTI. That is, at least one of the subframe and the TTI may be a subframe (1 ms) according to legacy LTE, may be a duration (e.g., 1 to 13 symbols) shorter than 1 ms or may be a duration longer than 1 ms. In addition, a unit that indicates the TTI may be referred to as, for example, a slot or a mini slot instead of a subframe.

In this regard, the TTI refers to, for example, a minimum time unit of scheduling of radio communication. For example, in the LTE system, the base station performs scheduling for allocating radio resources (a frequency bandwidth or transmission power that can be used in each user terminal) in TTI units to each user terminal. In this regard, a definition of the TTI is not limited to this.

The TTI may be a transmission time unit of a channel-coded data packet (transport block), code block or code word, or may be a processing unit of scheduling or link adaptation. In addition, when the TTI is given, a time period (e.g., the number of symbols) in which a transport block, a code block or a code word is actually mapped may be shorter than the TTI.

In addition, in a case where 1 slot or 1 mini slot is referred to as a TTI, 1 or more TTIs (i.e., 1 or more slots or 1 or more mini slots) may be a minimum time unit of scheduling. Furthermore, the number of slots (the number of mini slots) that make up a minimum time unit of the scheduling may be controlled.

The TTI having the time duration of 1 ms may be referred to as, for example, a general TTI (TTIs according to 3GPP Rel. 8 to 12), a normal TTI, a long TTI, a general subframe, a normal subframe, a long subframe or a slot. A TTI shorter than the general TTI may be referred to as, for example, a reduced TTI, a short TTI, a partial or fractional TTI, a reduced subframe, a short subframe, a mini slot, a subslot or a slot.

In addition, the long TTI (e.g., the general TTI or the subframe) may be read as a TTI having a time duration exceeding 1 ms, and the short TTI (e.g., the reduced TTI) may be read as a TTI having a TTI length less than the TTI length of the long TTI and equal to or more than 1 ms.

A Resource Block (RB) is a resource allocation unit of the time domain and the frequency domain, and may include one or a plurality of contiguous subcarriers in the frequency domain. The numbers of subcarriers included in RBs may be the same irrespectively of a numerology, and may be, for example, 12. The numbers of subcarriers included in the RBs may be determined based on the numerology.

Furthermore, the RB may include one or a plurality of symbols in the time domain or may have the length of 1 slot, 1 mini slot, 1 subframe or 1 TTI. 1 TTI or 1 subframe may each include one or a plurality of resource blocks.

In this regard, one or a plurality of RBs may be referred to as, for example, a Physical Resource Block (Physical RB (PRB)), a Sub-Carrier Group (SCG), a Resource Element Group (REG), a PRB pair or an RB pair.

Furthermore, the resource block may include one or a plurality of Resource Elements (REs). For example, 1 RE may be a radio resource domain of 1 subcarrier and 1 symbol.

A Bandwidth Part (BWP) (that may be referred to as, for example, a partial bandwidth) may mean a subset of contiguous common Resource Blocks (common RBs) for a certain numerology in a certain carrier. In this regard, the common RB may be specified by an RB index based on a common reference point of the certain carrier. A PRB may be defined based on a certain BWP, and may be numbered in the certain BWP.

The BWP may include a UL BWP (a BWP for UL) and a DL BWP (a BWP for DL). One or a plurality of BWPs in 1 carrier may be configured to the UE.

At least one of the configured BWPs may be active, and the UE may not assume to transmit and receive given signals/channels outside the active BWP. In addition, a "cell" and a "carrier" in the present disclosure may be read as a "BWP".

In this regard, structures of the above-described radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and the parameters described in the present disclosure may be expressed by using absolute values, may be expressed by using relative values with respect to given values or may be expressed by using other corresponding information. For example, a radio resource may be instructed by a given index.

Names used for parameters in the present disclosure are in no respect restrictive names. Furthermore, numerical expressions that use these parameters may be different from those explicitly disclosed in the present disclosure. Various channels (such as the PUCCH and the PDCCH) and information elements can be identified based on various suitable names. Therefore, various names assigned to these various channels and information elements are in no respect restrictive names.

The information and the signals described in the present disclosure may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or arbitrary combinations of these.

Furthermore, the information and the signals can be output at least one of from a higher layer to a lower layer and from the lower layer to the higher layer. The information and the signals may be input and output via a plurality of network nodes.

The input and output information and signals may be stored in a specific location (e.g., memory) or may be managed by using a management table. The information and signals to be input and output can be overridden, updated or additionally written. The output information and signals may be deleted. The input information and signals may be transmitted to other apparatuses.

Notification of information is not limited to the aspect/embodiments described in the present disclosure and may be performed by using other methods. For example, the information may be notified in the present disclosure by a physical layer signaling (e.g., Downlink Control Information (DCI) and Uplink Control Information (UCI)), a higher layer signaling (e.g., a Radio Resource Control (RRC) signaling, broadcast information (such as a Master Information Block (MIB) and a System Information Block (SIB)), and a Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by using, for example, an MAC Control Element (MAC CE).

Furthermore, notification of given information (e.g., notification of "being X") is not limited to explicit notification, and may be given implicitly (by, for example, not giving notification of the given information or by giving notification of another information).

Judgement may be made based on a value (0 or 1) expressed as 1 bit, may be made based on a boolean expressed as true or false or may be made by comparing numerical values (by, for example, making comparison with a given value).

Irrespectively of whether software is referred to as software, firmware, middleware, a microcode or a hardware description language or is referred to as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using at least ones of wired techniques (e.g., coaxial cables, optical fiber cables, twisted pairs and Digital Subscriber Lines (DSLs)) and radio techniques (e.g., infrared rays and microwaves), at least ones of these wired techniques and radio techniques are included in a definition of the transmission media.

The terms "system" and "network" used in the present disclosure can be interchangeably used. The "network" may mean an apparatus (e.g., base station) included in the network.

In the present disclosure, terms such as "precoding", a "precoder", a "weight (precoding weight)", "Quasi-Co-Location (QCL)", a "Transmission Configuration Indication state (TCI state)", a "spatial relation", a "spatial domain filter", "transmission power", "phase rotation", an "antenna port", an "antenna port group", a "layer", "the number of layers", a "rank", a "resource", a "resource set", a "resource group", a "beam", a "beam width", a "beam angle", an "antenna", an "antenna element" and a "panel" can be interchangeably used.

In the present disclosure, terms such as a "Base Station (BS)", a "radio base station", a "fixed station", a "NodeB", an "eNodeB (eNB)", a "gNodeB (gNB)", an "access point", a "Transmission Point (TP)", a "Reception Point (RP)", a "Transmission/Reception Point (TRP)", a "panel", a "cell", a "sector", a "cell group", a "carrier" and a "component carrier" can be interchangeably used. The base station is also referred to as terms such as a macro cell, a small cell, a femtocell or a picocell.

The base station can accommodate one or a plurality of (e.g., three) cells. When the base station accommodates a plurality of cells, an entire coverage area of the base station can be partitioned into a plurality of smaller areas. Each smaller area can also provide a communication service via a base station subsystem (e.g., indoor small base station (Remote Radio Head (RRH))). The term "cell" or "sector" indicates part or the entirety of the coverage area of at least one of the base station and the base station subsystem that provide a communication service in this coverage.

In the present disclosure, the terms such as "Mobile Station (MS)", "user terminal", "user apparatus (UE: User Equipment)" and "terminal" can be interchangeably used.

The mobile station is also referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

At least one of the base station and the mobile station may be referred to as, for example, a transmission apparatus, a reception apparatus or a radio communication apparatus. In addition, at least one of the base station and the mobile station may be, for example, a device mounted on a moving object or the moving object itself. The moving object may be a vehicle (e.g., a car or an airplane), may be a moving object (e.g., a drone or a self-driving car) that moves unmanned or may be a robot (a manned type or an unmanned type). In addition, at least one of the base station and the mobile station includes an apparatus, too, that does not necessarily move during a communication operation. For example, at least one of the base station and the mobile station may be an Internet of Things (IoT) device such as a sensor.

Furthermore, the base station in the present disclosure may be read as the user terminal. For example, each aspect/embodiment of the present disclosure may be applied to a configuration where communication between the base station and the user terminal is replaced with communication between a plurality of user terminals (that may be referred to as, for example, Device-to-Device (D2D) or Vehicle-to-Everything (V2X)). In this case, the user terminal 20 may be configured to include the functions of the above-described base station 10. Furthermore, words such as "uplink" and "downlink" may be read as a word (e.g., a "side") that matches terminal-to-terminal communication. For example, the uplink channel and the downlink channel may be read as side channels.

Similarly, the user terminal in the present disclosure may be read as the base station. In this case, the base station 10 may be configured to include the functions of the above-described user terminal 20.

In the present disclosure, operations performed by the base station are performed by an upper node of this base station depending on cases. Obviously, in a network including one or a plurality of network nodes including the base stations, various operations performed to communicate with a terminal can be performed by base stations, one or more network nodes (that are regarded as, for example, Mobility Management Entities (MMEs) or Serving-Gateways (S-GWs), yet are not limited to these) other than the base stations or a combination of these.

Each aspect/embodiment described in the present disclosure may be used alone, may be used in combination or may be switched and used when carried out. Furthermore, orders of the processing procedures, the sequences and the flowchart according to each aspect/embodiment described in the present disclosure may be rearranged unless contradictions arise. For example, the method described in the present disclosure presents various step elements by using an exemplary order and is not limited to the presented specific order.

Each aspect/embodiment described in the present disclosure may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New-Radio Access Technology (RAT), New Radio (NR), New radio access (NX), Future generation radio access (FX), the Global System for Mobile communications (GSM (registered trademark)), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods, or next-generation systems that are enhanced based on these systems. Furthermore, a plurality of systems may be combined (for example, LTE or LTE-A and 5G may be combined) and applied.

The phrase "based on" used in the present disclosure does not mean "based only on" unless specified otherwise. In other words, the phrase "based on" means both of "based only on" and "based at least on".

Every reference to elements that use names such as "first" and "second" used in the present disclosure does not generally limit the quantity or the order of these elements. These names can be used in the present disclosure as a convenient method for distinguishing between two or more elements. Hence, the reference to the first and second elements does not mean that only two elements can be employed or the first element should precede the second element in some way.

The term "deciding (determining)" used in the present disclosure includes diverse operations in some cases. For example, "deciding (determining)" may be considered to "decide (determine)" judging, calculating, computing, processing, deriving, investigating, looking up, search and inquiry (e.g., looking up in a table, a database or another data structure), and ascertaining.

Furthermore, "deciding (determining)" may be considered to "decide (determine)" receiving (e.g., receiving information), transmitting (e.g., transmitting information), input, output and accessing (e.g., accessing data in a memory).

Furthermore, "deciding (determining)" may be considered to "decide (determine)" resolving, selecting, choosing, establishing and comparing. That is, "deciding (determining)" may be considered to "decide (determine)" some operation.

Furthermore, "deciding (determining)" may be read as "assuming", "expecting" and "considering".

"Maximum transmit power" disclosed in the present disclosure may mean a maximum value of transmit power, may mean the nominal UE maximum transmit power, or may mean the rated UE maximum transmit power.

The words "connected" and "coupled" used in the present disclosure or every modification of these words can mean every direct or indirect connection or coupling between 2 or more elements, and can include that 1 or more intermediate elements exist between the two elements "connected" or "coupled" with each other. The elements may be coupled or connected physically or logically or by a combination of these physical and logical connections. For example, "connection" may be read as "access".

It can be understood in the present disclosure that, when connected, the two elements are "connected" or "coupled" with each other by using 1 or more electric wires, cables or printed electrical connection, and by using electromagnetic energy having wavelengths in radio frequency domains, microwave domains or (both of visible and invisible) light domains in some non-restrictive and non-comprehensive examples.

A sentence that "A and B are different" in the present disclosure may mean that "A and B are different from each other". In this regard, the sentence may mean that "A and B are each different from C". Words such as "separate" and "coupled" may be also interpreted in a similar way to "different".

In a case where the words "include" and "including" and modifications of these words are used in the present disclosure, these words intend to be comprehensive similar to the word "comprising". Furthermore, the word "or" used in the present disclosure intends to not be an exclusive OR.

In a case where, for example, translation adds articles such as a, an and the in English in the present disclosure, the present disclosure may include that nouns coming after these articles are plural.

The invention according to the present disclosure has been described in detail above. However, it is obvious for a person skilled in the art that the invention according to the present disclosure is not limited to the embodiments described in the present disclosure. The invention according to the present disclosure can be carried out as modified and changed aspects without departing from the gist and the scope of the invention defined based on the recitation of the claims. Accordingly, the description of the present disclosure is intended for exemplary explanation, and does not bring any restrictive meaning to the invention according to the present disclosure.

The invention claimed is:

1. A terminal comprising:
 a transmitter that transmits capability information indicating that full power transmission is supported;
 a receiver that receives a higher layer parameter for configuring partial-coherent and non-coherent codebook subsets and downlink control information indicating a codebook to be applied to uplink transmission; and
 a processor that controls, based on association between a precoding information and number of layers field included in the downlink control information and a Transmitted Precoding Matrix Indicator (TPMI), to perform the full power transmission by applying, to the uplink transmission, a fully coherent codebook corresponding to TPMI indicated by a value of the field,
 wherein a plurality of possible values are provided in the field, some of which indicate TPMIs corresponding to mutually different fully coherent codebooks.

2. The terminal according to claim 1, wherein when receiving the higher layer parameter for configuring the partial-coherent and non-coherent codebook subsets or when receiving the higher layer parameter for configuring the non-coherent codebook subsets only, the value in the field included in the downlink control information indicates the TPMI corresponding to at least one same fully coherent codebook.

3. A base station comprising:
 a receiver that receives capability information indicating that full power transmission is supported;
 a transmitter that transmits a higher layer parameter for configuring partial-coherent and non-coherent codebook subsets and downlink control information indicating a codebook to be applied to uplink transmission; and
 a processor that controls to receive uplink full power transmission to which, based on association between a precoding information and number of layers field included in the downlink control information and a Transmitted Precoding Matrix Indicator (TPMI), a fully coherent codebook corresponding to TPMI indicated by a value of the field is applied, wherein a plurality of possible values are provided in the field, some of which indicate TPMIs corresponding to mutually different fully coherent codebooks.

4. A radio communication method for a terminal, comprising:

transmitting capability information indicating that full power transmission is supported;

receiving a higher layer parameter for configuring partial-coherent and non-coherent codebook subsets and downlink control information indicating a codebook to be applied to uplink transmission; and controlling, based on association between a precoding information and number of layers field included in the downlink control information and a Transmitted Precoding Matrix Indicator (TPMI), to perform the full power transmission by applying, to the uplink transmission, a fully coherent codebook corresponding to TPMI indicated by a value of the field, wherein a plurality of possible values are provided in the field, some of which indicate TPMIs corresponding to mutually different fully coherent codebooks.

5. A system comprising: a terminal; and a base station, wherein the terminal comprises:

a transmitter that transmits capability information indicating that full power transmission is supported;

a receiver that receives a higher layer parameter for configuring partial-coherent and non-coherent codebook subsets and downlink control information indicating a codebook to be applied to uplink transmission; and a processor that controls, based on association between a precoding information and number of layers field included in the downlink control information and a Transmitted Precoding Matrix Indicator (TPMI), to perform the full power transmission by applying, to the uplink transmission, a fully coherent codebook corresponding to TPMI indicated by a value of the field, wherein a plurality of possible values are provided in the field, some of which indicate TPMIs corresponding to mutually different fully coherent codebooks; and the base station comprises:

a receiver that receives the capability information;

a transmitter that transmits the higher layer parameter and the downlink control information; and a processor that controls to receive uplink full power transmission.

* * * * *